US012725034B2

(12) United States Patent
Ma et al.

(10) Patent No.: US 12,725,034 B2
(45) Date of Patent: Sep. 1, 2026

(54) MODELLING CAUSATION IN MACHINE LEARNING

(71) Applicant: Microsoft Technology Licensing, LLC, Redmond, WA (US)

(72) Inventors: Chao Ma, Cambridge (GB); Cheng Zhang, Cambridge (GB); Matthew Ashman, Cambridge (GB); Marife Defante, Woodinville, WA (US); Karen Fassio, Bremerton, WA (US); Joel Jennings, Cambridge (GB); Agrin Aram Hilmkil, Stockholm (SE)

(73) Assignee: Microsoft Technology Licensing, LLC., Redmond, WA (US)

( * ) Notice: Subject to any disclaimer, the term of this patent is extended or adjusted under 35 U.S.C. 154(b) by 950 days.

(21) Appl. No.: 17/936,338

(22) Filed: Sep. 28, 2022

(65) Prior Publication Data

US 2024/0104370 A1 Mar. 28, 2024

Related U.S. Application Data

(60) Provisional application No. 63/376,541, filed on Sep. 21, 2022.

(51) Int. Cl.
*G06N 3/08* (2023.01)
*G06N 3/0455* (2023.01)

(52) U.S. Cl.
CPC ............. *G06N 3/08* (2013.01); *G06N 3/0455* (2023.01)

(58) Field of Classification Search
CPC ............................... G06N 3/08; G06N 3/0455
See application file for complete search history.

(56) References Cited

U.S. PATENT DOCUMENTS

| | | | |
|---|---|---|---|
| 7,117,185 | B1 | 10/2006 | Aliferis |
| 10,699,450 | B2 | 6/2020 | Weissbrod |

(Continued)

FOREIGN PATENT DOCUMENTS

| | | | |
|---|---|---|---|
| WO | 2007144804 | A1 | 12/2007 |

OTHER PUBLICATIONS

Chen, Y., Zhang, J. & Qin, X., "Interpretable instance disease prediction based on causal feature selection and effect analysis." BMC Med Inform Decis Mak 22, 51 (2022) (Year: 2022).*

(Continued)

*Primary Examiner* — Viker A Lamardo
*Assistant Examiner* — Sally T. Ley
(74) *Attorney, Agent, or Firm* — Barta Jones, PLLC

(57) ABSTRACT

A method comprising: sampling a first causal graph from a first graph distribution modelling causation between variables in a feature vector, and sampling a second causal graph from a second graph distribution modelling presence of possible confounders, a confounder being an unobserved cause of both of two variables. The method further comprises: identifying a parent variable which is a cause of a selected variable according to the first causal graph, and which together with the selected variable forms a confounded pair having a respective confounder being a cause of both according to the second causal graph. A machine learning model encodes the parent to give a first embedding, and encodes information on the confounded pair give a second embedding. The embeddings are combined and then decoded to give a reconstructed value. This mechanism may be used in training the model or in treatment effect estimation.

20 Claims, 8 Drawing Sheets

(56) References Cited

U.S. PATENT DOCUMENTS

| | | | | |
|---|---|---|---|---|
| 12,034,747 | B2 | 7/2024 | Raghavendra | |
| 2009/0006289 | A1 | 1/2009 | Jaros | |
| 2011/0112998 | A1 | 5/2011 | Abe | |
| 2011/0167031 | A1 | 7/2011 | Kleinberg | |
| 2013/0046721 | A1 | 2/2013 | Jiang et al. | |
| 2016/0292248 | A1 | 10/2016 | Garcia | |
| 2017/0220937 | A1 | 8/2017 | Wada | |
| 2019/0326019 | A1 | 10/2019 | Ramazzotti | |
| 2020/0233920 | A1 | 7/2020 | Meeds | |
| 2020/0245009 | A1 | 7/2020 | Saini | |
| 2020/0279417 | A1* | 9/2020 | Lee | G06T 11/206 |
| 2021/0064517 | A1 | 3/2021 | Wong | |
| 2021/0256406 | A1 | 8/2021 | Lau | |
| 2022/0093271 | A1 | 3/2022 | Huang | |
| 2023/0065173 | A1 | 3/2023 | Shibahara | |
| 2023/0072173 | A1 | 3/2023 | Gupta | |
| 2023/0128111 | A1 | 4/2023 | Herbert | |
| 2023/0359867 | A1 | 11/2023 | Park | |
| 2023/0376734 | A1 | 11/2023 | Liu | |
| 2023/0401423 | A1 | 12/2023 | Sim | |
| 2024/0047042 | A1 | 2/2024 | Daza | |
| 2024/0104338 | A1 | 3/2024 | Gong | |
| 2024/0126945 | A1 | 4/2024 | Bellot | |

OTHER PUBLICATIONS

Of Mireshghallah, et. al., arXiv:2004.12254v5 [cs.LG] Nov. 7, 2020 (Year: 2020).*

Sharp, et. al., arXiv:1609.08097v1 [cs.CL] Sep. 26, 2016; (Year: 2016).*

Zečević, et al., arXiv:2109.04173v3 [cs.LG] Oct. 22, 2021 (Year: 2021).*

Geffner, et al., "FCause: Flow-based Causal Discovery", Retrieved From: https://openreview.net/attachment?id=HO_LL-oqBzW8tname=pdf, Sep. 29, 2021, 19 Pages.

International Preliminary Report on Patentability received for PCT Application No. PCT/US2023/031000, Apr. 3, 2025, 14 pages.

International Preliminary Report on Patentability received for PCT Application No. PCT/US23/031103, mailed on Apr. 3, 2025, 10 pages.

Kaiser, et al., "Unsuitability of NoTears for Causal Graph Discovery", In Repository of arXiv:2104.05441v1, Apr. 12, 2021, 5 Pages.

Lippe, et al., "Efficient Neural Causal Discovery without Acyclicity Constraints", In Repository of arXiv:2107.10483v1, Jul. 22, 2021, 34 Pages.

Monti, et al., "Autoregressive Flow-Based Causal Discovery and Inference", In Repository of arXiv:2007.09390v1, Jul. 18, 2020, 6 Pages.

Ness, et al., "A Bayesian Active Learning Experimental Design for Inferring Signaling Networks", In Proceedings of International Conference on Research in Computational Molecular Biology, May 3, 2017, 11 Pages.

Pearl, Judea, "Causal Inference in Statistics: An Overview", In Journal of Statistics Surveys, vol. 3, Oct. 13, 2009, pp. 96-146.

Reisach, et al., "Beware of the Simulated DAG! Varsortability in Additive Noise Models", In Repository of arXiv:2102.13647v1, Feb. 26, 2021, 19 Pages.

Zheng, et al., "DAGs with No Tears: Smooth Optimization for Structure Learning", In Repository of arXiv:1803.01422v1, Mar. 4, 2018, 14 Pages.

Amornbunchornvej, et al., "Variable-Lag Granger Causality for Time Series Analysis", In Proceedings of IEEE International Conference on Data Science and Advanced Analytics (DSAA), Oct. 5, 2019, pp. 21-30.

Bellot, et al., "Deconfounded Score Method: Scoring DAGs with Dense Unobserved Confounding", In Repository of arXiv:2103.15106v2, May 25, 2021, 19 Pages.

Zheng, et al., "DAGs with No Tears: Smooth Optimization for Structure Learning", In Proceedings of Advances in Neural Information Processing Systems, vol. 31, Nov. 9, 2021, 14 Pages.

Bhattacharya, et al., "Differentiable Causal Discovery Under Unmeasured Confounding", In Proceedings of The 24th International Conference on Artificial Intelligence and Statistics, PMLR, Apr. 13, 2021, 11 Pages.

Blei, et al., "Variational Inference: A Review for Statisticians", In Journal of The American Statistical Association, vol. 112, Issue 518, Feb. 27, 2017, pp. 859-877.

Bussmann, et al., "Neural Additive Vector Autoregression Models for Causal Discovery in Time Series", In Proceedings of International Conference on Discovery Science, Oct. 9, 2021, pp. 446-460.

Bussmann, et al., "Neural Additive Vector Autoregression Models for Causal Discovery in Time Series", In Repository of arXiv:2010.09429v2, Oct. 18, 2021, 18 Pages.

Cai, et al., "Triad Constraints for Learning Causal Structure of Latent Variables", In Proceedings of Advances in Neural Information Processing Systems, vol. 32, Dec. 8, 2019, 10 Pages.

Dang, et al., "seq2graph: Discovering Dynamic Dependencies from Multivariate Time Series with Multi-level Attention", In Repository of arXiv:1812.04448v1, Dec. 7, 2018, 9 Pages.

Durkan, et al., "Neural Spline Flows", In Proceedings of Advances in Neural Information Processing Systems, vol. 32, Dec. 8, 2019, 12 Pages.

Geffner, et al., "Deep End-to-end Causal Inference", In Repository of arXiv:2202.02195v2, Jun. 20, 2022, 31 Pages.

Glymour, et al., "Review of Causal Discovery Methods Based on Graphical Models", In Journal of Frontiers in Genetics, vol. 10, Article 524, Jun. 4, 2019, 15 Pages.

Granger, Clivew. , "Investigating Causal Relations by Econometric Models and Cross-spectral Methods", In Journal of Econometrica, vol. 37, Issue 3, Aug. 1, 1969, pp. 424-438.

Guo, et al., "A Survey of Learning Causality with Data: Problems and Methods", In Proceedings of ACM Computing Surveys, vol. 53, Issue 4, Jul. 22, 2020, 37 Pages.

Heckerman, et al., "A Bayesian Approach to Causal Discovery", In Publication of Springer Berlin Heidelberg, 2006, 28 Pages.

Hoyer, et al., "Nonlinear Causal Discovery with Additive Noise Models", In Proceedings of Advances in Neural Information Processing Systems (NIPS), vol. 21, Dec. 8, 2008, 8 Pages.

Hyvärinen, et al., "Estimation of a Structural Vector Autoregression Model Using Non-Gaussianity", In Journal of Machine Learning Research, vol. 11, May 1, 2010, pp. 1709-1731.

Jang, et al., "Categorical Reparameterization with Gumbel-Softmax", In Repository of arXiv:1611.01144v1, Nov. 3, 2016, 13 Pages.

Zhang, et al., "On the Identifiability of the Post-Nonlinear Causal Model", In Repository of arXiv:1205.2599v1, May 9, 2012, pp. 647-655.

Löwe, et al., "Amortized Causal Discovery: Learning to Infer Causal Graphs from Time-Series Data", In Proceedings of Machine Learning Research, vol. 140, Apr. 11, 2022, 17 Pages.

Maathuis, et al., "Handbook of Graphical Models", In Publication of CRC Press, Nov. 12, 2018, 546 Pages.

Maddison, et al., "The Concrete Distribution: A Continuous Relaxation of Discrete Random Variables", In Repository of arXiv:1611.00712v2, Nov. 6, 2016, 17 Pages.

Moraffah, et al., "Causal Inference for Time Series Analysis: Problems, Methods and Evaluation", In Journal of Knowledge and Information Systems, vol. 63, Nov. 23, 2021, pp. 3041-3085.

Naser, et al., "Causality, Causal Discovery, and Causal Inference in Structural Engineering", In Repository of arXiv:2204.01543v3, Aug. 8, 2022, 27 Pages.

Pamfil, et al., "DynoTears: Structure Learning from Time-Series Data", In Repository of arXiv:2002.00498v2, Apr. 27, 2020, 23 Pages.

Pamfil, et al., "DynoTears: Structure Learning from Time-Series Data", In Proceedings of International Conference on Artificial Intelligence and Statistics, Aug. 26, 2020, 10 Pages.

Pawlowski, et al., "Deep Structural Causal Models for Tractable Counterfactual Inference", In Proceedings of Advances in Neural Information Processing Systems, vol. 33, Dec. 6, 2020, 13 Pages.

Pena, Josem. , "Learning Acyclic Directed Mixed Graphs from Observations and Interventions", In Proceedings of the Eighth

(56) References Cited

OTHER PUBLICATIONS

International Conference on Probabilistic Graphical Models, PMLR, vol. 52, Sep. 6, 2016, pp. 392-403.
Pena, Josem. , "Reasoning with Alternative Acyclic Directed Mixed Graphs", In Journal of Behaviormetrika, vol. 45, Issue 2, Oct. 2018, pp. 389-422.
Peters, et al., "Causal Inference on Time Series using Restricted Structural Equation Models", In Proceedings of Advances in Neural Information Processing Systems, vol. 26, Dec. 5, 2013, 9 Pages.
Peters, et al., "Causal Inference on Time Series using Structural Equation Models", In Repository of arXiv:1207.5136v1, Jul. 21, 2012, 11 Pages.
Peters, et al., "Elements of Causal Inference: Foundations and Learning Algorithms", Published by MIT Press, Nov. 29, 2017, 289 Pages.
Peters, et al., "Identifiability of Causal Graphs using Functional Models", In Repository of arXiv:1202.3757v1, Feb. 14, 2012, 10 Pages.
Richardson, Thomas, "Markov Properties for Acyclic Directed Mixed Graphs", In Scandinavian Journal of Statistics, vol. 30, No. 1, Feb. 28, 2003, pp. 145-157.
Runge, Jakob, "Causal network reconstruction from time series: From theoretical assumptions to practical estimation", In Journal of Chaos: An Interdisciplinary Journal of Nonlinear Science, vol. 28, Issue 7, Jul. 24, 2018, 20 Pages.
Shojaie, et al., "Discovering Graphical Granger Causality Using the Truncating Lasso Penalty", In Journal of Bioinformatics, vol. 26, Issue 18, Sep. 15, 2010, pp. 1517-i523.
Siggiridou, et al., "Granger Causality in Multivariate Time Series Using a Time-Ordered Restricted Vector Autoregressive Model", In Journal of IEEE Transactions on Signal Processing, vol. 64, Issue 7, Apr. 2016, pp. 1759-1773.
Spirtes, et al., "Causation, Prediction, and Search", In Publication of MIT Press, 2000, 546 Pages.
Tank, et al., "Neural Granger Causality for Nonlinear Time Series", In Journal of Stat, vol. 1050, Feb. 19, 2018, 18 Pages.
Tian, et al., "A General Identification Condition for Causal Effects", In Publication of eScholarship, University of California, Aug. 1, 2002, pp. 567-573.
Trippe, et al., "Conditional Density Estimation with Bayesian Normalising Flows", In Repository of arXiv:1802.04908v1, Feb. 14, 2018, 19 Pages.
Wu, et al., "Discovering Nonlinear Relations with Minimum Predictive Information Regularization", In Repository of arXiv:2001.01885v1, Jan. 7, 2020, 26 Pages.
Xu, et al., "Scalable Causal Graph Learning through a Deep Neural Network", In Proceedings of the 28th ACM International Conference on Information and Knowledge Management, Nov. 3, 2019, 10 Pages.
Zhang, et al., "Advances in Variational Inference", In Journal of IEEE Transactions on Pattern Analysis and Machine Intelligence, vol. 41, Issue 8, Aug. 2019, pp. 2008-2026.
Zhang, et al., "On Estimation of Functional Causal Models: General Results and Application to the Post-Nonlinear Causal Model", In Journal of ACM Transactions on Intelligent Systems and Technology (TIST), vol. 7, No. 2, Dec. 17, 2015, 23 Pages.
International Search Report and Written Opinion received for PCT Application No. PCT/US2023/031000, Dec. 15, 2023, 19 pages.
International Search Report and Written Opinion received for PCT Application No. PCT/US23/031103, mailed on Jan. 9, 2024, 14 pages.
Lowe S., et al., "Amortized Causal Discovery: Learning to Infer Causal Graphs from Time-Series Data," arxiv.org, Cornell University Library, 201 Olin Library Cornell University Ithaca, NY 14853, Feb. 21, 2022, 27 pages.
Meng Y., "Estimating Granger Causality with Unobserved Confounders via Deep Latent-Variable Recurrent Neural Network," arxiv.org, Cornell University Library, 201 Olin Library,Cornell University Ithaca, NY 14853, Sep. 9, 2019, 9 pages.
Wang, et al., "Estimating Individualized Causal Effect with Confounded Instruments", Proceedings of the 2020 5th International Conference on Big Data and computing, Aug. 14, 2022, pp. 1857-1867.
Zecevic M., et al., "Relating Graph Neural Networks to Structural Causal Models," arxiv.org, Cornell University Library, 201 Olin Library, Cornell University Ithaca, NY 14853, Oct. 22, 2021, 29 pages.
Berrevoets et al., "Disentangled Counterfactual Recurrent Networks for Treatment Effect Inference over Time", In Repository of arXiv:2112.03811v1, Dec. 7, 2021, 20 pages.
Dreesbach, et al., "Variational Autoencoder Modular Bayesian Networks for Simulation of Heterogeneous Clinical Study Data", Frontiers in Big Data, vol. 8, Article 16, May 28, 2020, 15 pages.
Gong et al., "Causal Discovery from Temporally Aggregated Time Series", Uncertainty in artificial intelligence: proceedings of the Conference on Uncertainty in Artificial Intelligence, 2017, 22 pages.
Kaddour et al., "Causal Effect Inference for Structured Treatments", 35th Conference on Neural Information Processing Systems (NeurIPS2021), Dec. 2021, 14 pages.
Liu et al., "Learning Temporal Causal Graphs for Relational Time-Series Analysis", Proceedings of the 27th International Conference on Machine Learning, (ICM L-10), 2010, 8pages.
Non-Final Office Action mailed on Sep. 24, 2025, in U.S. Appl. No. 17/936,347, 45 pages.
Wang et al., "CausalGNN: Causal-Based Graph Neural Networks for Spatio-Temporal Epidemic Forecasting", In Proceedings of Thirty-Sixth AAAI Conference on Artificial Intelligence, vol. 36, No. 11, 2022, pp. 12191-12199.
Wang et al., "Inductive Representation Learning in Temporal Networks via Causal Anonymous Walks", In repository of arXiv:2101.05974v1, Jan. 15, 2021, 21 pages.
Wang et al., "Meta-learning Causal Discovery", In Repository of arXiv:2209.05598v1, Sep. 12, 2022, 15 pages.
Zhang et al., "A Gated Dilated Causal Convolution Based Encoder-Decoder for Network Traffic Forecasting", IEEE Access, Jan. 1, 2020, pp. 6087-6097.
Zhang et al., "Causal GraphSAGE: A Robust Graph Method for Classification Based on Causal Sampling", In Pattern Recognition, vol. 128, Aug. 2022, 11 pages.
Notice of Allowance mailed on Feb. 4, 2026, in U.S. Appl. No. 17/936,347, 8 pages.

* cited by examiner 104
106
102
ML model
ML algorithm
108
API
110
Training data
112
Internet
114

Figure 2
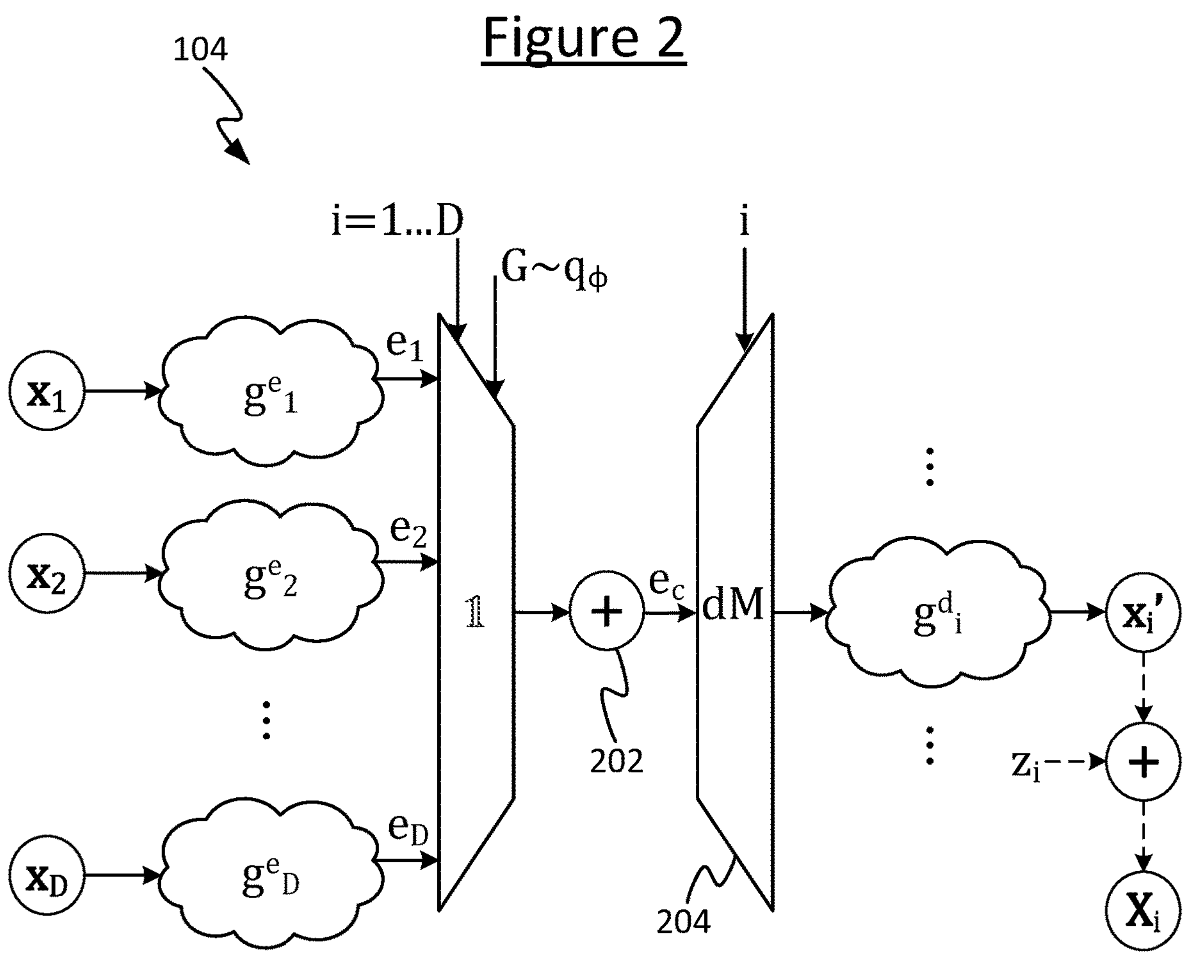
Figure 3
Figure 4
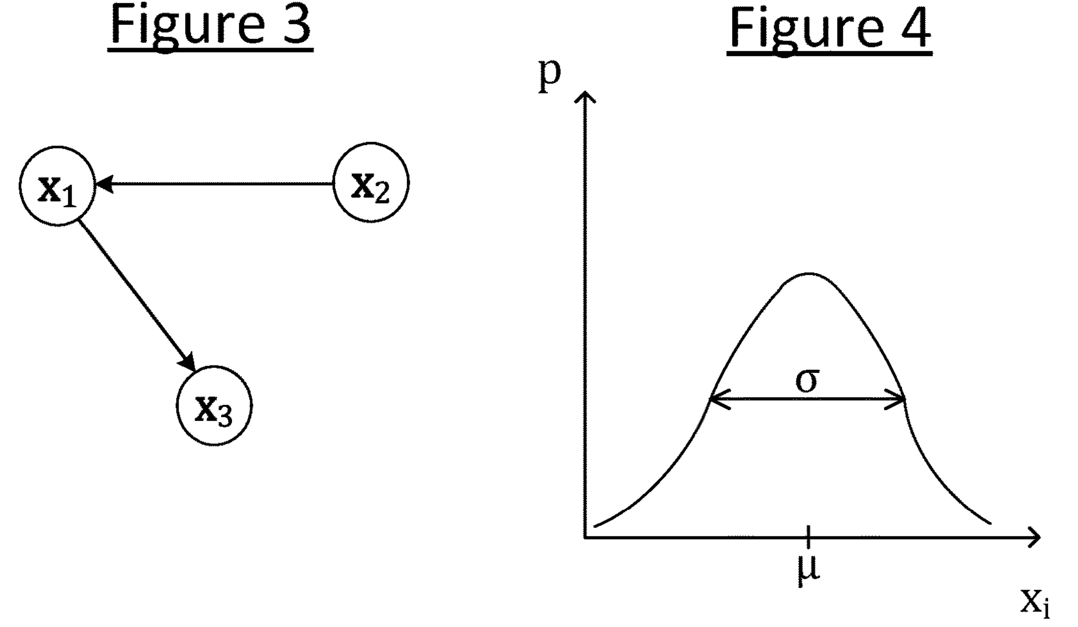

104

$i=1 \ldots D$ $G \sim q_\phi$ h $x_1$ $g^e{}_1$ $e_1$ $x_2$ $g^e{}_2$ $e_2$ $\mathbb{1}$ $x_D$ $g^e{}_D$ $e_D$ 104'
G~q1(=qϕ)
G~q2
u12
u13
u1D
u23
u24
u2D
ge12
g 13
ge1D
ge23
g u24
ge2D
e12
e13
e1D
e23
e24
e2D
Etc.
𝟙'
εi
H
x1
x2
xD
ge1
ge2
geD
e1
e2
eD
i=1...D

MODELLING CAUSATION IN MACHINE LEARNING

CROSS-REFERENCE TO RELATED APPLICATION

This application claims the benefit of U.S. provisional application No. 63/376,541 filed on Sep. 21, 2022, entitled "MODELLING CAUSATION IN MACHINE LEARNING," the entirety of which is hereby incorporated by reference herein.

BACKGROUND

Neural networks are used in the field of machine learning and artificial intelligence (AI). A neural network comprises plurality of nodes which are interconnected by links, sometimes referred to as edges. The input edges of one or more nodes form the input of the network as a whole, and the output edges of one or more other nodes form the output of the network as a whole, whilst the output edges of various nodes within the network form the input edges to other nodes. Each node represents a function of its input edge(s) weighted by a respective weight, the result being output(s) on its output edge(s). The weights can be gradually tuned based on a set of training data so as to tend towards a state where the output of the network will output a desired value for a given input.

Typically the nodes are arranged into layers with at least an input and an output layer. A "deep" neural network comprises one or more intermediate or "hidden" layers in between the input layer and the output layer. The neural network can take input data and propagate the input data through the layers of the network to generate output data. Certain nodes within the network perform operations on the data, and the result of those operations is passed to other nodes, and so on.

Each node is configured to generate an output by carrying out a function on the values input to that node. The inputs to one or more nodes form the input of the neural network, the outputs of some nodes form the inputs to other nodes, and the outputs of one or more nodes form the output of the network. At some or all of the nodes of the network, the input to that node is weighted by a respective weight. A weight may define the connectivity between a node in a given layer and the nodes in the next layer of the neural network. A weight can take the form of a scalar or a probabilistic distribution. When the weights are defined by a distribution, as in a Bayesian model, the neural network can be fully probabilistic and captures the concept of uncertainty. The values of the connections between nodes may also be modelled as distributions. The distributions may be represented in the form of a set of samples or a set of parameters parameterizing the distribution (e.g. the mean $\mu$ and standard deviation $\sigma$ or variance $\sigma^2$).

The network learns by operating on data input at the input layer, and adjusting the weights applied by some or all of the nodes based on the input data. There are different learning approaches, but in general there is a forward propagation through the network from input layer to output layer, a calculation of an overall error, and a backward propagation of the error through the network from output layer to input layer. In the next cycle, each node takes into account the back propagated error and produces a revised set of weights. In this way, the network can be trained to perform its desired operation.

Training may employ a supervised approach based on a set of labelled training data. Other approaches are also possible, such as a reinforcement approach wherein the network each data point is not initially labelled. The learning algorithm begins by guessing the corresponding output for each point, and is then told whether it was correct, gradually tuning the weights with each such piece of feedback. Another example is an unsupervised approach where input data points are not labelled at all and the learning algorithm is instead left to infer its own structure in the experience data.

Other forms of machine learning model are also known, other than just neural networks, for example clustering algorithms, random decision forests, and support vector machines, or any other form of parametric or non-parametric function.

Some machine learning models can be designed to perform causal discovery using observational data or both observational and interventional data. That is, for a set of variables (e.g. $[x_1, x_2, x_3]$), the model when trained can estimate a likely causal graph describing the causal relationships between these variables. E.g. in the case of three variables a simple causal graph could be $x_1 \rightarrow x_2 \rightarrow x_3$, meaning that $x_1$ causes $x_2$ and $x_2$ causes $x_3$ (put another way, $x_3$ is an effect of $x_2$ and $x_2$ is an effect of $x_1$). Or as another example, $x_1 \rightarrow x_2 \leftarrow x_3$, means that $x_1$ and $x_3$ are both causes of $x_2$ ($x_2$ is an effect of $x_1$ and $x_3$). However, in the past such models were only used for causal discovery alone, not for treatment effect estimation for decision making. Another type of model aims to perform treatment effect estimation, which commonly assumes that the causal graph is already given by the user. Such methods did not previously work with unknown causal graphs.

"Deep End-to-End Causal Inference" [DECI] (Geffner et al, Microsoft Research, https://arxiv.org/pdf/2202.02195.pdf) appreciated that in many applications, users would benefit from the ability to perform treatment effect estimation for decision making with observational data only, without needing to know the causal graph. Accordingly, Geffner et al provided an integrated machine learning model that both models the causal relationships between variables and performs treatment effect estimation, by averaging over multiple possible causal graphs sampled from a distribution. This advantageously allows the method to exploit a model that has been trained for causal discovery in order to also estimate treatment effects. The method thus enables "end-to-end" causal inference.

SUMMARY

It is recognized herein that there is still further scope to improve on the DECI model developed by Geffner et al, or the like. Particularly, the possible presence of hidden confounders has the potential to bias existing models. Consider two variables $x_1$ and $x_2$ and a model which is attempting to discover whether there is a causal edge between them, or to predict a treatment effect based on the modelled causation. A hidden confounder is a third variable which is not observed and which is a cause of both $x_1$ and $x_2$. This could lead to a false conclusion that $x_1$ is the cause of $x_2$ (or vice versa) when in fact there is no causal link (or a weaker causal link) and instead both $x_1$ and $x_2$ are an effect of a common causal variable $u_{12}$ (a confounder) which is not present in the input data (i.e. not one of the variables of the input feature vector). For instance in the healthcare field $x_1$ could measure the presence or absence of a certain condition (e.g. disease) in a subject, whilst $x_2$ could be a lifestyle factor such as an aspect of the subject's diet (e.g. salt or fat intake, etc.) or whether they are a smoker, and the confounder $u_{12}$ could be a measure of a socioeconomic circumstance of the patient (e.g. annual income). Ignoring the socioeconomic circumstance may give the false impression that the lifestyle factor $x_2$ causes the condition $x_1$, whereas in fact the ground truth is that both $x_1$ and $x_2$ are effects the socioeconomic circumstance.

To address such possibilities, the present disclosure provides a machine learning model which models the possibility of hidden confounders as latent variables model.

According to one aspect disclosed herein, there is provided a computer-implemented method comprising: a) selecting a selected variable from among variables of a feature vector; and b) sampling a first causal graph from a first graph distribution and sampling a second causal graph from a second graph distribution. The first causal graph models causation between variables in the feature vector, and the second causal graph models presence of possible confounders, a confounder being an unobserved cause of both of two variables in the feature vector. The method further comprises: c) from among of the variables of the feature vector, identifying a parent variable which is a cause of the selected variable according to the first causal graph, and which together with the selected variable forms a confounded pair having a respective confounder being a cause of both according to the second causal graph. The method then comprises: d) inputting an input value of the parent variable into a first encoder, resulting in a respective embedding of the parent variable; and e) inputting the input value of at least the parent variable (and optionally an input value of the selected variable and/or one or more others of the variables of the feature vector) into an inference network, resulting in a latent value modelling the respective confounder of the confounded pair. The latent value is input into a second encoder, resulting in an embedding of the confounder of the confounded pair. The method then further comprises: f) combining the embedding of the parent variable with the embedding of the confounder of the confounded pair, resulting in a combined embedding; and g) inputting the combined embedding into a decoder, resulting in a reconstructed value of the selected variable.

The model may advantageously be used to discover the likely presence of hidden confounders, and optionally estimate their values. Alternatively or additionally the model may be used to perform treatment effect estimation which takes into account the possibility of hidden confounders in the causal graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 is a schematic computation diagram illustrating an example of a DECI type machine learning model that performs end-to-end causal inference but does not account for latent confounders;

FIG. 3 schematically illustrates an example of a causal graph;

FIG. 4 is schematic sketch of an example of a probabilistic distribution;

DETAILED DESCRIPTION OF EMBODIMENTS

Example System Overview

Figure 1:
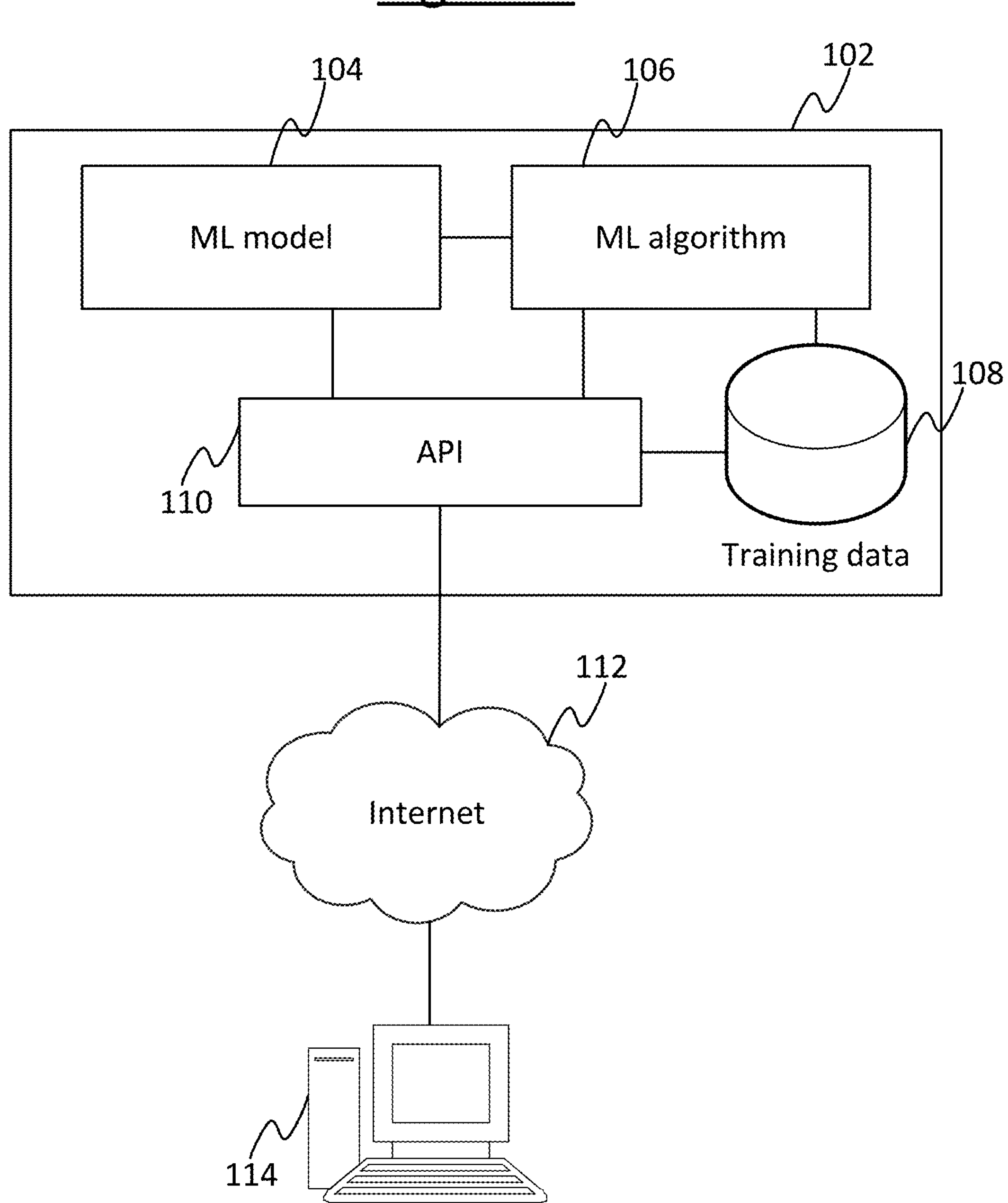
FIG. 1 is a schematic block diagram of a system in accordance with embodiments disclosed herein.

FIG. 1 illustrates an example system according to embodiments of the present disclosure. The system comprises a server system 102 of a first party, a network 112, and a client computer 114 of a second party. The server system 102 and client computer 114 are both operatively coupled to the network 112 so as to be able to communicate with one another via the network 112. The network 112 may take any suitable form and may comprise one or more constituent networks, e.g. a wide area network such as the Internet or a mobile cellular network, a local wired network such as an Ethernet network, or a local wireless network such as a Wi-Fi network, etc.

The server system 102 comprises processing apparatus comprising one or more processing units, and memory comprising one or more memory units. The, or each, processing unit may take any suitable form, e.g. a general purpose processor such as a CPU (central processing unit); or an accelerator processor or application specific processor such as a dedicated AI accelerator processor or a repurposed GPU (graphics processing unit), DSP (digital signal processor), or cryptoprocessor, etc. The, or each, memory unit may also take any suitable form, e.g. an EEPROM, SRAM, DRAM or solid state drive (SSD); a magnetic memory such as a magnetic disk or tape; or an optical medium such as an optical disk drive, quartz glass storage or magneto-optical memory; etc.

In the case of multiple processing units and/or memory units, these may be implemented in the same physical server unit, or different server units in the same rack or different racks, or in different racks in the same data centre or different data centres at different geographical sites. In the case of multiple server units, these may be networked together using any suitable networking technology such as a server fabric, an Ethernet network, or the Internet, etc. Distributed computing techniques are, in themselves, known in the art.

The memory of the server system 102 is arranged to store a machine learning (ML) model 104, a machine learning algorithm 106, training data 108, and an application programming interface (API) 110. The ML model 104, ML algorithm 106 and API 110 are arranged to run on the processing apparatus of the server system 102. The ML algorithm 106 is arranged so as, when run, to train the ML model 104 based on the training data 108. Once the model 104 is trained, the ML algorithm 106 may then estimate treatment effects based on the trained model. In some cases, after the ML model 104 been trained based on an initial portion of training data 108 and been made available for use in treatment effect estimation, training may also continue in an ongoing manner based on further training data 108, e.g. which may be obtained after the initial training.

The API 110, when run, allows the client computer 114 to submit a request for treatment effect estimation to the ML algorithm 106. The ML model 104 is a function of a plurality of variables. The request may specify a target variable to be examined, and may supply input values of one or more other variables (including intervened-on values and/or conditioned values). In response, the ML algorithm 106 may control the ML model 104 to generate samples of the target variable given the intervened-on and/or conditioned values of the one or more other variables. The API 110 returns the result of the requested causal query (the estimated treatment effect) to the client computer 114 via the network 112.

In embodiments, the API may also allow the client computer to submit some or all of the training data 108 for use in the training.

Causal Machine Learning Model

FIG. 2 schematically illustrates an example implementation of a machine learning model 104 of a type disclosed in "Deep End-to-End Causal Inference" (DECI) by Geffner et al. The ML model 104 comprises a respective encoder $$g_i^d$$

and a respective decoder $$g_i^d$$

for each of a plurality of variables $x_i$, where i is an index running from 1 to D where D>1. The set of variables $x_I \ldots x_D$ may be referred to as the input feature vector.

Each variable represents a different property of a subject being modelled. The subject may for example be a real-life entity, such as a human or other living being; or an object such as a mechanical, electrical or electronic device or system, e.g. industrial machinery, a vehicle, a communication network, or a computing device etc.; or a piece of software such as a game, operating system software, communications software, networking software, or control software for controlling a vehicle or an industrial processor or machine. Each property could be an inherent property of the being or object, or an environment of the being or object which may affect the being or object or be affected by the being or object.

For instance in a medical example, the variables represent different properties of a person or other living being (e.g. animal). One or more of the variables may represent a symptom experienced by the living being, e.g. whether the subject is exhibiting a certain condition such as a cough, sore throat, difficulty breathing, etc. (and perhaps a measure of degree of the condition), or a measured bodily quantity such as blood pressure, heart rate, vitamin D level, etc. One or more of the variables may represent environmental factors to which the subject is exposed, or behavioural factors of the subject, such as whether the subject lives in an area of high pollution (and perhaps a measure of the pollution level), or whether the subject is a smoker (and perhaps how many per day), etc. And/or, one or more of the variables may represent inherent properties of the subject such as a genetic factor.

In the example of a device, system or software, one or more of the variables may represent an output state of the device, system or software. One or more of the variables may represent an external factor to which the device, system or software is subjected, e.g. humidity, vibration, cosmic radiation, and/or a state of one or more input signals. For instance the variables may comprise a control signal, and/or an input image or other sensor data captured from the environment. Alternatively or additionally, one or more of the variables may represent an internal state of the device, system or software, e.g. an error signal, resource usage, etc.

One, more or all of the variables may be observed or observable. In some cases, one or more of the variables may be unobserved or unobservable.

Each respective encoder $$g_i^e$$

is arranged to receive an input value of its respective variable $x_i$, and to generate a respective embedding $e_i$ (i.e. a latent representation) based on the respective input value. As will be familiar to a person skilled in the art, an embedding, or latent representation or value, is in itself a known concept. It represents in the information in the respective input variable an abstracted form, typically in a compressed form, which is learned by the respective encoder during training. The embedding may be a scalar value, or may be a vector of dimension 'embedding_dim' which is greater than 1.

Note that a "value" as referred to herein could be a vector value or a scalar value. For example if one of the variables is an image (e.g. a scan of the subject), then the "value" of this vector variable is the array pixel values for the image.

The different variables $x_i$ may have a certain causal relationship between them, which may be expressed as a causal graph. A causal graph may be described as comprising a plurality of nodes and edges (note that these are not the same thing as the nodes and edges mentioned earlier in the context of a neural network). Each node represents a respective one of the variables $x_i$ in question. The edges are directional and represent causation. I.e. an edge from $x_{i=k}$ to $x_{i=l}$ represents that $x_k$ causes $x_1$ ($x_l$ is an effect of $x_k$). A simple example involving three variables is shown in FIG. 3. In this example $x_2$ causes $x_1$, and $x_1$ causes $x_3$. For example $x_3$ may represent having a respiratory virus, $x_1$ may represent a lung condition and $x_2$ may represent a genetic predisposition.

Of course other possible graphs are possible, including those with more variables and other causal relationships.

A given graph G may be expressed as a matrix, with two binary elements for each possible pair of variables $x_{i=k}$, $x_{i=l}$; one binary element to represent whether an edge exists between the two variables, and one to represent the direction of the edge if it exists (e.g. 0=no edge from k to l, 1=edge from k to l, or vice versa). For example for three variables this could be written as:

$$G = \begin{pmatrix} \text{Exists}1,2 & Dir1,2 \\ \text{Exists}1,3 & Dir1,3 \\ \text{Exists}2,3 & Dir2,3 \end{pmatrix}$$

Other equivalent representations are possible. E.g. an alternative representation of the probabilities of existence and direction of edges in a graph would be:

$$G = \begin{pmatrix} \text{Exists}1 \to 2 & \text{Exists}1 \to 3 & \text{Exists}2 \to 3 \\ \text{Exists}2 \to 1 & \text{Exists}3 \to 1 & \text{Exists}3 \to 1 \end{pmatrix}$$

For any given situation, the actual causal graph may not be known. A distribution $q_\phi$ of possible graphs may be expressed in a similar format to G, but with each element comprising a parameter $\phi$ (phi, also drawn $\varphi$) representing a probability instead of a binary value.

$$q_\varphi = \begin{pmatrix} \varphi\_\text{exists}1,2 & \varphi\_\text{dir}1,2 \\ \varphi\_\text{exists}1,3 & \varphi\_\text{dir}1,3 \\ \varphi\_\text{exists}2,3 & \varphi\_\text{dir}2,3 \end{pmatrix}$$

(Or an equivalent representation.) In other words the parameter $\phi$_exists1,2 represents the probability that an edge between $x_1$ and $x_2$ exists; $\phi$_dir1,2 represents the probability that the direction of the possible edge between $x_1$ and $x_2$ is directed from $x_1$ to $x_2$ (or vice versa); parameter $\phi$_exists1,2 represents the probability that an edge between $x_1$ and $x_3$ exists; etc.

Returning to FIG. 2, the ML model 104 further comprises a selector $\mathbb{1}$, a combiner 202 and a demultiplexer 204. It will be appreciated that these are schematic representations of functional blocks implemented in software. The selector $\mathbb{1}$ is operable to sample a causal graph G from the distribution. This means selecting a particular graph G (with binary elements) whereby the existence and direction of the edges are determined pseudorandomly according to the corresponding probabilities in the distribution $q_\phi$.

Preferably the possible graphs are constrained to being directed acyclic graphs (DAGs), for the sake of practicality and simplicity of modelling.

The selector $\mathbb{1}$ also receives a value of the index i for a selected target variable $x_i$. For the currently selected variable $x_i$ (node of index i in the graph), the selector $\mathbb{1}$ selects the respective embeddings $e_{Pa(i)}$ generated by the respective encoders $$g^e_{Pa(i)}$$

of the parents Pa(i) of the node i (variable $x_i$) in the currently sampled graph G, and inputs these into the combiner 202.

The combiner 202 combines the selected embeddings $e_{Pa(i)}$ into a combined embedding $e_c$. In embodiments the combination is a sum. In general a sum could be a positive or negative sum (a subtraction would be a sum with negative weights). The combined (summed) representation thus has the same dimension as a single embedding, e.g. 'embedding_dim'. In alternative implementations however it is not excluded that another form of combination could be used, such as a concatenation.

The demultiplexer 204 also receives the index i of the currently selected variable $x_i$, and supplies the combined embedding $e_c$ into the input of the decoder $$g^e_{Pa(i)}$$

associated with the currently selected variable $x_i$. This generates a value of a respective noiseless reconstructed version $$x_i'$$

of the respective variable $x_i$ based on the combined embedding $e_c$.

The encoders $$g^e_{i=1 \ldots D}$$

and decoders $$g^d_{i=1 \ldots D}$$

are constituent machine learning models comprised by the overall ML model 104. They are each parameterized by respective sets of parameters $\theta$ which are tuned during learning. In embodiments, each of the encoders $$g^e_{i=1 \ldots D}$$

and decoders $$g^d_{i=1 \ldots D}$$

is a respective neural network (in which case their parameters may be referred to as weights). However it is not excluded that some or all of them could instead be implemented with another form of constituent machine learning model.

Training

Figure 7:
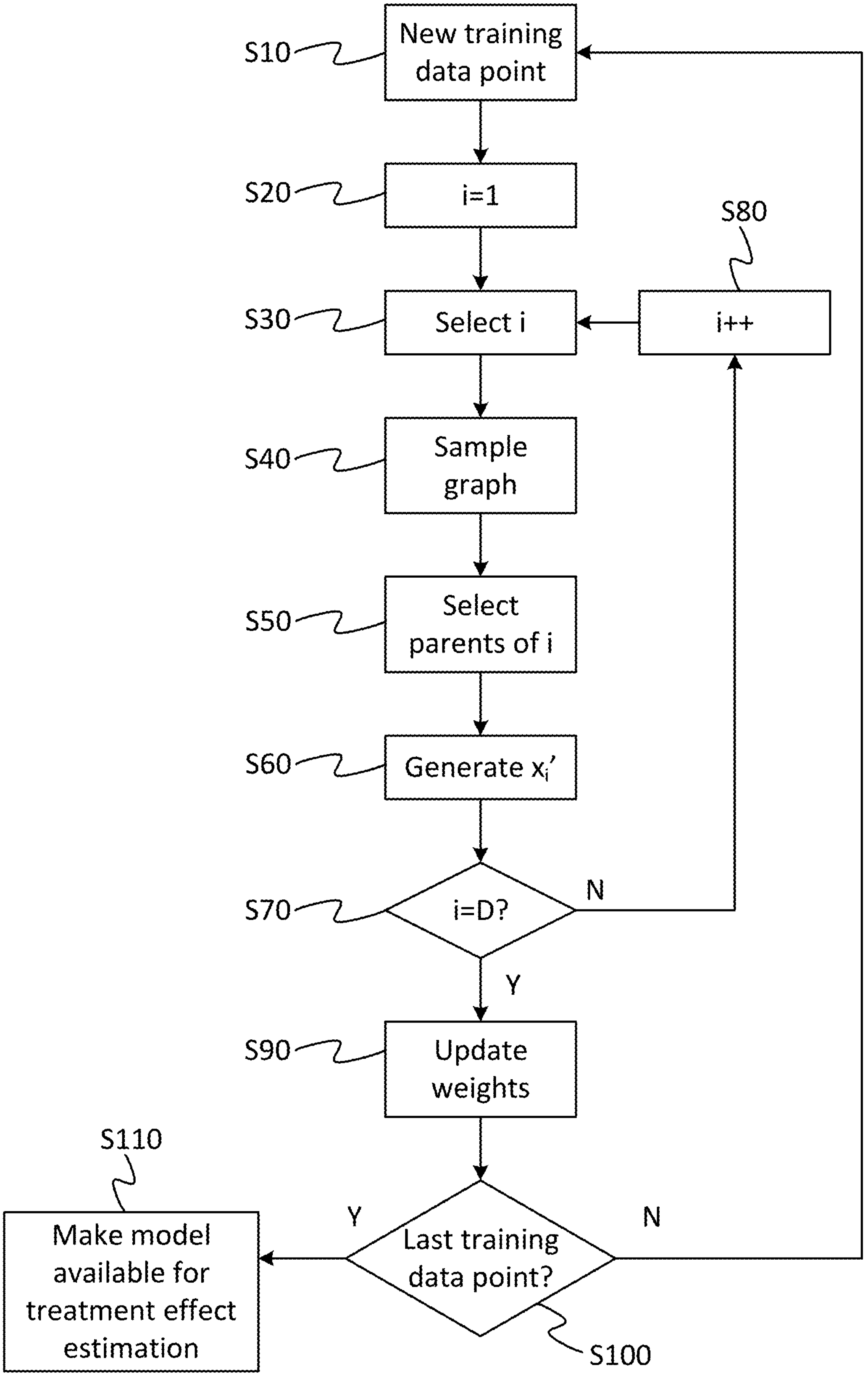
FIG. 7 is a schematic flowchart of a method of training a model.

FIG. 7 schematically represents a method of training the DECI type model 104 based on a training data 108. The training data 108 comprises a plurality of training data points. Each data point $[x_1 \ldots x_D]$ comprises a set of input values, one respective value for each of the variables $x_i$.

The method processes each of the training data points, at least in an initial portion of the training data 108. At step S10 the method takes a new data point from memory, and at step S20 the index i is set to a first value (e.g. i=1) to specify a first target variable $x_i$ from among the set of variables in the data point. At step S30, this causes the selector $\mathbb{1}$ to select the target variable $x_i$ with the currently set value of the index i as the variable to be processed. At step S40 the selector 𝟙 samples a random graph G from the distribution $q_\phi$. At step S50, the selector 𝟙 selects the parents Pa(i) of the target variable $x_i$ (node i in the graph) and supplies the respective embeddings $e_{Pa(i)}$ from the encoders $$g^e_{Pa(i)}$$

of the selected parents into the combiner 202. At step S60, the combiner 202 combines (e.g. sums) the embeddings of the selected parents Pa(i) into the combined embedding $e_c$, and the demultiplexer 204 selects to supply the combined embedding $e_c$ into the decoder $$g^{dd}_i$$

of the target variable $x_i$. The respective decoder $$g^d_i$$

is thus caused to generate a noiseless reconstruction $$x'_i$$

of the selected target variable $x_i$.

This could equally be expressed as:

$$x'_i = g^d_i\left(\sum\nolimits_{j \in Pa(i)} g^e_j(x_j)\right)$$

where $\Sigma_{j\in Pa(i)}$ is another way of writing the operations of the selector 𝟙 and combiner 202. Preferably, G is a DAG (directed and acyclic) so that it is valid to generate the value of any node in this way. The difference $x_i - x_i'$ may be referred to as the residual.

The process is repeated for each variable $x_i$ in the set of variables, i.e. for i=1 . . . D, thus creating a full reconstructed set of values $$[x'_1 \ldots x'_D]$$

for the data point in question. This is represented schematically by steps S70 and S80 in FIG. 7, looping back to S30. However note that this the "loop" may be a somewhat schematic representation. In practice some or all of the different variables $x_i$ for a given data point could be processed in parallel.

At step S90 the ML algorithm 106 applies a training function which updates the parameters (e.g. weights) θ of the encoders $$g^e_{i=1 \ldots D}$$

and decoders $$g^d_{i=1 \ldots D}.$$

Simultaneously it also updates the parameters ϕ of the distribution $q_\phi$ of possible graphs. The training function attempts to update the parameters θ, ϕ in such a way as to reduce a measure of overall difference between the set of input values of the set of input variables $[x_1 \ldots x_D]$ and the reconstructed version of the set variables $$[x'_1 \ldots x'_D].$$

For example in embodiments the training function is an evidence lower bound (ELBO) function. Training techniques of this kind are, in themselves, known in the art, e.g. based on stochastic back propagation and gradient descent.

During the training phase, $x_i$ is an observed data value that is attempted to be reconstructed. The residual $$x_i - x'_i$$

between the reconstruction and the observation may be used to compute the ELBO objective.

In embodiments, the model 104 may be a probabilistic model that it assigns a joint probability (likelihood) $p(X_1, \ldots, X_D)$ to all the variables $X_1, \ldots, X_D$; where $X_i$ represents the noiseless reconstruction $x_i$ combined with a random noise term $z_i$, e.g. additively $$(X_i = x'_i + z_i),$$

and zi may be sampled from a random distribution, $z_i \sim p(z_i)$. In such embodiments, then in order to train the model 104, one first collects a real-world data point with D-dimensional features $(x_1, x_2, \ldots, x_D)$, and then maximizes the likelihood of it being generated by the model. That is to say, the training operates to try to maximize $p(X_1=x_1, X_2=x_2, \ldots, X_D=X_D)$. This is done by adjusting the parameters (e.g. weights) θ of the model 104. The ELBO mentioned previously is an example of a numerical approximation to the quantity $p(X_1=x_1, X_2=x_2, \ldots, X_D=x_D)$. ELBO is typically much easier to compute than $p(X_1=x_1, X_2=x_2, \ldots, X_D=x_D)$.

The above-described process is repeated for each of the data points in the training data 108 (or at least an initial portion of the training data). This is represented schematically in FIG. 7 by step S100 and the loop back to S10. Though again, this form of illustration may be somewhat schematized and in some implementations, batches of data points could be reconstructed in parallel, and the model parameters updated based on the batches.

At the beginning of the overall training method the graph distribution $q_\phi$ may start with some predetermined set of probabilities, e.g. all elements 0.5 for the existence and direction of each possible edge, or using some prior domain knowledge to inform which edges are possible or impossible, or more or less likely. Then, as the model is trained with more and more data points, the probabilities (i.e. the parameters ϕ of $q_\phi$) are gradually learned in parallel with the parameters θ (e.g. weights) of the encoders and decoders $$g^e_{i=1 \ldots D}, g^d_{i=1, \ldots D}.$$

Treatment Effect Estimation

Once the DECI model 104 has been trained sufficiently based on all the data points in the training data 108 (or at least an initial portion of the initial training data), then at step S110 the trained ML model 104 is made available to be used for treatment effect estimation (i.e., answering causal queries). In embodiments, this may comprise making the model 104 available to via the API 110 to estimate treatment effects/answer causal queries requested by the client computer 114.

Figure 8:
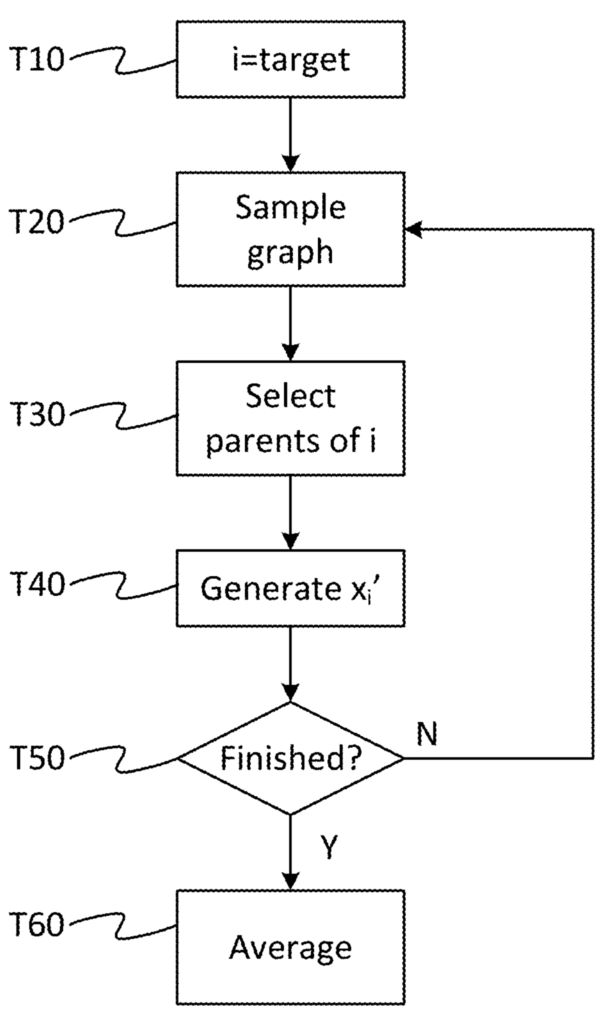
FIG. 8 is a schematic flowchart of a method of making treatment effect estimations using a trained model, by selecting a target variable with index i and an intervened-on variable (i.e. the treatment)

A method of using the ML model 104 to estimate a treatment effect is shown schematically in FIG. 8.

At step T10 the index i is set to that of a target variable $x_i$ whose treatment effect is to be estimated. In addition, the input values of one or more "intervened-on" variables are also set to their known values. The intervened-on variables are variables whose values are set to some specified value, to represent that the property that they represent has been controlled (the treatment, i.e. an intervention on the modelled property). An "intervened-on" variable could also be referred to as a treated variable or controlled variable. For example, in the medical application, the intervened-on variable(s) may represent one or more interventions performed on the subject, and the target variable may represent a possible symptom or condition of the subject (e.g. the presence of a certain disease). Or in the case where the subject is a device or software, the intervened-on variable(s) may represent one or more states that are set to defined values, and the target variable may represent a condition or state of the device or software that is being diagnosed.

At step T20, the selector 𝟙 samples a graph G pseudorandomly from the distribution $q_\phi$ according to the probabilities ϕ. In other words the chance of there existing an edge in given direction between each pair of nodes i=k, i=l in the sampled graph G is determined by the pair of parameters ϕ_exists(k,l); ϕ_dir(k, l). Although optionally, some of the learned probabilities could be overridden to predetermined values based on prior knowledge (e.g. in some scenarios a given causality could be ruled out—probability set to zero—or may be known to be unlikely, either based on a priori or empirical knowledge).

At step T30 the selector 𝟙 selects the parents Pa(i) of the target variable $x_i$ in the sampled graph G, and supplies the respective embeddings $e_{Pa(i)}$ from the encoders $$g^e_{Pa(i)}$$

of the selected parents into the combiner 202 to be combined (e.g. summed) into the combined embedding $e_c$. The demultiplexer 204 selects to pass the combined embedding $e_c$ into the decoder $$g^d_i$$

of the target variable $x_i$, thus causing it to generate a noiseless reconstruction of $$x'_i.$$

Thus the selection 𝟙 selects the parents of node i in the graph G, so it depends on both i and G. The index is set to a particular target node i that one is trying to estimate (as well as selecting a graph G from $q_\phi$), and the model 104 outputs a noiseless reconstruction of $x_i$, denoted by $$x'_i.$$

During training, such reconstruction was formed of each node given the actual data for its parent nodes.

Now at test time, the model 104 is used in a slightly different way for treatment effect estimation. Here, the target variable $x_i$ which is now treated as unknown, and the goal is to generate simulated values of the target variable, given other interventional variables. In some embodiments the simulated value could just be taken as the noiseless reconstructed value $x_i$. However for some purposes, the noiseless reconstruction $x_i'$ of the target variable $x_i$ may not be considered preferable, and instead the full interventional distribution may be taken into account. This can characterized by the following sources of uncertainties: 1), different realizations of the graph G that could happen to have been selected during sampling (even an unlikely one), which can be modelled by simulating different graphs from $q_\phi$; and 2), the randomness of the residual noise random variables $z_i$. The latter can be taken into account by the following simulation equation:

$$X_i = g^d_i\left(\sum\nolimits_{j \in Pa(i)} g^e_j(x_j)\right) + z_i,\ z_i \sim p(z_i).$$

In other words, during the treatment effect estimation phase, $X_i$ is a simulated value that is obtained through random sampling of $z_i$, wherein $X_i=x_i'+z_i$ (except for $x_{i=T}$, the intervened-on variable). More generally in other possible implementations, the noise $z_i$ could be combined with the noiseless reconstruction $x_i'$ in other ways in order to obtain Xi, not necessarily additively.

In the following description, reference may be made to $X_i$ as the simulated value of target variable $x_i$. However generally the simulated value could simply be the noiseless reconstructed value $$x'_i,$$

or $X_i$ (which takes into account noise, e.g.

$$X_i = x'_i + z_i),$$

or a value which is simulated based on the reconstructed value $x_i'$ in any other way.

By whatever means the simulated value is determined, according to the present disclosure, an average is taken over multiple sampled graphs. In embodiments, an average is taken over multiple sampled graphs and residual noise variables $z_i$. In other words, for a given target variable $x_i$ to be estimated, multiple values of variable $X_i$ are simulated based on different respective sampled graphs G, each time sampled randomly from both $q_\phi$ and $z_i$ This is represented schematically in FIG. 8 by the loop from step T50 back to T20, to represent that multiple simulated values of $x_i$ are determined (for a given target variable $x_i$), each determined based on a different randomly sampled graph G (each time sampled from the distribution $q_\phi$) and optionally noises $z_i$. Again the illustration as a loop may be somewhat schematized, and in embodiments some or all of the different simulated values for a given target variable $x_i$, based on the different sampled graphs and sampled residual noises z, may in fact be computed in parallel.

In embodiments the average could be taken as a simple mean, median or mode of the different values of the simulated values $$x_i' \text{ or } X_i'$$

of the variable $x_i$ (as simulated with the different sampled graphs and optionally residual noises). In embodiments, such averaging is based on estimating an expectation of the probabilistic distribution of the simulated values.

FIG. 4 schematically illustrates the idea of a probabilistic distribution $p(x_i)$. The horizontal axis represents the value of the target variable being simulated, $x_i$, and the vertical axis represents the probability that the variable takes that value. If the distribution is modelled as having a predetermined form, it may be described by one or more parameters, e.g. a mean $\mu$ and standard deviation a or variance $\sigma^2$ in the case of a Gaussian. Other more complex distributions are also possible, which may be parameterized by more than two parameters, e.g. a spline function. As a convenient shorthand the probabilistic distribution may be referred to as a function the target variable of $x_i$, i.e. $p(x_i)$, in the sense that it models the distribution of the target variable $x_i$, but in fact it will be appreciated that the distribution is in fact determined based on the corresponding simulated values $x_i'$ or $X_i$.

Based on the trained model 104, it is possible using statistical methods to estimate an expectation $E[p(x_Y)|do(x_T=val1)]$ of the probabilistic distribution p of a particular target variable $x_{i=Y}$ given the intervened value val1 of another, treatment/intervention variable $x_{i=T}$. In embodiments, the target variable $x_Y$ may model an outcome of a treatment modelled by $x_T$. Note that "treatment" as used most broadly herein does not necessarily limit to a medical treatment or a treatment of a living being, though those are certainly possible use cases. In other examples, the treatment may comprise applying a signal, repair, debugging action or upgrade to an electronic, electrical or mechanical device or system, or software, where the effect may be some state of the device, system or software which is to be improved by the system. In embodiments, the actual real-world treatment may be applied in dependence on the estimation (e.g. expectation) of the effect of the modelled treatment, for example on condition that the treatment estimation (e.g. expectation) is above or below a specified threshold or within a specified range.

One suitable measure of expectation may be referred to as the average treatment effect (ATE). This may be expressed as:

$$E[p(x_Y)|do(x_T=val1)]-E[p(x_{i=Y})|(do(x_T=val2)]$$

or $$E[p(x_Y)|do(x_T=val1)]-E[p(x_{i=Y})]$$

which could also be expressed $E[p(x_Y)|do(x_T=val1)]-E[p(x_{i=Y})|do(x_T=mean(x_T))]$, where val1 is some treatment, val2 is some other treatment, and "do" represents applying the treatment. In other words, the ATE is the difference between: a) the expectation of the distribution of the effect $x_Y$ given the value val1 of a treatment $x_T$ and b) the expectation of the distribution of the effect $x_Y$ given the value val2 of a treatment $x_T$, or the difference between a) the expectation of the distribution of the effect $x_Y$ given the value val1 of a treatment $x_T$ and b) the expectation of the distribution of the effect $x_Y$ without applying a value of the treatment $x_T$. Note that in variants the equality $x_T$=val1 or $x_T$=val2 could be replaced with another form of expression such as a "greater than", "less than" or range type expression.

An estimation of $E[p(x_Y)|do(x_T=treatment)$ may be determined based on the modelled distributions of noise, together with the learned graph and arrow functions. This may be done using the noise distribution at node $x_Y$ and using noise samples from other upstream variables, plus knowledge of the graph and its behaviour under the intervention $do(x_T=treatment)$, in order to thus make the ATE estimation calculation. The expectation $E[p(x_Y)|do(x_T=val)]$ of a target variable $x_Y$ given a treatment $x_T$=val may be computed as:

$$E\left[g_Y^d\left(\sum_{i\in Pa(Y)} e_i\right)+z_Y\right]$$

where $z_Y$ is a noise term. E is an average over everything that is random in the equation. Consider for example a simple graph:

$$x_1 \rightarrow x_2 \leftarrow x_3$$

where $x_1$ is the treatment $x_T$, and $x_2$ is the target variable $x_Y$. In the computation of E, $x_1$ is set to its known value. E may then be written:

$$E\left[g_Y^d(g_1^e(x_1=val)+g_3^e(x_3))+z_Y\right]$$

To compute E, one example method is simply to take the mean of the different sampled values $$x_Y'$$

or $x_Y$ of the target variable $x_Y$, based on the different sampled graphs, optionally also including some random noise (e.g. additive noise) in each sample. Another option is to fit the sampled values of $x_Y$ to a predetermined form of distribution, such shown as in FIG. 4, e.g. a Gaussian, normal or spline function (again optionally also including random noise). The average may then be determined as the average of the fitted distribution.

Note that during the determination of the multiple instances of $$x_i'$$

it is possible, especially for some distributions, that the same graph G ends up being sampled multiple times, or even every time. However the graph is still being freshly sampled each time and even if the sampled graphs turn out to be the same, they may still be described as different instances of the sampled graph, in the sense that they are individually sampled anew each time. In the case where the multiple graphs happen to be the same, then the averaging only averages the noise z.

In some cases, if the treated (i.e. controlled) variable has one or more parents, the graph G may be mutilated: $G \rightarrow G_{do(xT=val)}$. E.g. consider the graph:

$$x_4 \rightarrow x_1 \rightarrow x_2 \leftarrow x_3$$

where again $x_1$ is the treatment $x_T$, and $x_2$ is the target variable $x_Y$. In the computation of E, $x_1$ is set to its known value. Therefore $x_4$ has no effect on the outcome of $x_2$. So in the determination of the expectation, the graph is mutilated to remove the node $x_4$ and the edge from $x_4 \rightarrow x_1$. In other words, fixing the value of the known (controlled) variable $x_1$ means that any effect of the edge from the parent of the known variable $x_1$.

Another type of average which may be determined according to embodiments disclosed herein may be referred to as the conditional ATE (CATE). This is the difference between: a) the expectation of the target variable $x_Y$ given the treatment $x_T$=val1 conditional on an observation $\gamma$ of at least one other of the variables $x_C$ in the set, and b) the expectation of the target variable $x_Y$ without the treatment (either with a different treatment val2 or no treatment) but still conditional on the same observation of $x_C$. That is, or:

$$E[p(x_Y)|\text{do}(x_T=val1), x_C=\gamma]-E[p(x_Y)|\text{do}(x_T=val2), x_C=\gamma]$$

or $$E[p(x_Y)|\text{do}(x_T=val1), x_C=\gamma]-E[p(x_Y)|, x_C=\gamma]$$

which could also be expressed $E[p(x_Y)|\text{do}(x_T=\text{val1}), x_C=\gamma]-E[p(x_{i=Y})|\text{do}(x_T=\text{mean}(x_T))\ x_C=\gamma]$.

Note that in variants the equality $x_T$=val1, $x_T$=val2, or $x_C=\gamma$ could be replaced with another form of expression such as a "greater than", "less than" or range type expression.

Figures 5, 6:
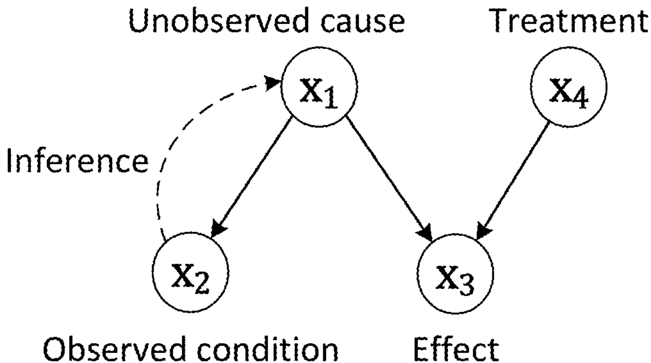
FIG. 5 schematically illustrates another example of a causal graph including a hidden cause.
FIG. 6 is a schematic computation diagram illustrating a further machine learning model including an inference network for conditional treatment effect estimation.

FIG. 5 illustrates by way of example why estimating the conditional treatment effect is not necessarily straightforward. In this example $x_3$ is the target $x_Y$ whose treatment effect will be estimated and $x_4$ is the treatment $x_T$, where the treatment is the cause of the target effect. In addition, there is another, unobserved cause $x_1$ of the target effect, and another observable effect $x_2$ of the unobserved cause $x_i$. The variable $x_2$ is to be the observed condition $x_C$. For instance, in a medical example the target effect $x_3$ could be some condition or symptom of the subject (e.g. a respiratory problem), the treatment $x_4$ could be a possible medical intervention (e.g. taking some drug or vitamin), the unobserved cause $x_1$ may be a genetic factor, and the other observable cause $x_2$ may be some observable physical quality of the subject's body (e.g. body mass index). In general the unobserved cause could be unobservable, or merely unobserved.

The observable condition $x_2$ contains information about the unobserved cause $x_1$, which in turn can reveal information about the desired effect $x_3$ ($=x_Y$). For example if it is known that an athlete is in the Olympics and that they are a footballer, this reduces the probability that they are also a rower. In fact for any two variables that are effects of a common cause and whose intersection is not 100%, knowing something about one gives information about the other. E.g. if it is known that a subject has lung cancer and that they were exposed to a carcinogenic chemical other than tobacco, this reduces the probability that they were are smoker.

However the causal direction is from $x_1 \rightarrow x_2$, and the model 104 of FIG. 2 is only configured to learn effects of causes in the direction from cause to effect—it is not configured to learn inferences of effect from cause. I.e. it is not configured to "go against the arrows" in the figure (the directional causal edges).

To address this, as illustrated in FIG. 6, in embodiments the ML model 104 may be adapted to include at least one inference network h disposed between at least one observable condition $x_c$ ($x_2$ in the example) and at least one unobservable potential cause ($x_1$ in the example) of the condition $x_c$. As illustrated in FIG. 6, in some such embodiments, the inference network h (or individual such networks) may be disposed between the unobserved cause and multiple potential effects (up to all the other variables). This will allow the model to learn which variable(s) may be an effect of the unobserved cause, if relationship is not prior knowledge.

The inference network(s) h may be trained at the training stage simultaneously along with the encoders $g^e$ and decoders $g^d$ and the parameters of the graph distribution $q_\phi$, or alternatively after the rest of the model (see below). In embodiments the inference network h may comprise a neural network, in which case training the inference network comprises tuning the weights of the inference network. Alternatively the use of other forms of machine learning is not excluded for the inference network.

The inclusion of the inference model makes it possible to estimate a conditional expectation such as $E[x_Y|\text{do}(x_T=\text{val1}), x_C=\gamma]$.

To estimate the conditional expectation, then initially during the estimation of the target variable $x_Y$, the conditional variable $x_c$ is not fixed. In other words, the method proceeds as described above with respect to ATE, to obtain multiple different samples of $x_Y$ based on multiple respective sampled graphs. At the same time, respective simulated samples $x_c$ of the conditional variable are also obtained in the same way based on the respective sampled graphs. This gives a two dimensional set of samples ($x_Y$, $x_c$), which could be described as a plot or "scatter plot". Then a predetermined form of function is fitted to the 2D set of samples ($x_Y$, $x_c$), such as a straight line, a curve, or a probabilistic distribution. After that, $x_c$ is set to its observed value in the fitted function, and a corresponding value of $x_Y$ is read out from the fitted function. This is taken as the conditional expectation of $x_Y$ given $x_c$.

At least two alternative variants to computing CATE may be employed, depending on implementation.

Variant I: estimate CATE using the same approach as used to estimate ATE, but performing a re-weighing of the terms inside of the expectations such that the condition (that gives CATE its name) is satisfied. This type of approach is known as an importance sampling technique. The weights of the different samples used to compute the expectation are provided by an inference network, which is trained together with the rest of the ML model 104.

Variant II: after the model 104 of FIG. 2 has been trained and a specific CATE query is received (e.g. via the API 110), the inference network h is trained to estimate the effect variable from the conditioning variable. To train this model, data simulated from the trained model of FIG. 2 is used, while applying some treatment specified in the query. Then the conditional average treatment effect is estimated by inputting the relevant value of the conditioning variable into the inference network h. It returns a distribution over effects from which the expected effect can be computed.

The main difference between the two approaches is that the first solely uses components learnt from the observed data during model training, while the second requires learning a new network after the model 104 has been trained. The reasoning for proposing both methods is that there are specifics settings where one or the other are more computationally efficient.

Note that the disclosed methods are not limited to the controlled (i.e. treated) variable $x_T$ being a direct parent of the target variable $x_Y$ (i.e. the variable whose treatment effect being estimated). The treated variable or the effect variable can be any arbitrary variable in the set $x_{i=1 \ldots D}$, e.g. a grandparent of the target variable $x_Y$.

In embodiments, the simulation of the target variable takes into account a potential effect of all causal variables across the sampled graph. An example implementation of this is as follows. This may be used in conjunction with any of the ways of averaging discussed above, or others.

The method of estimating the target variable $x_Y$ (e.g. the treatment effect) may comprise an inner and an outer loop. In the inner loop, the method loops through i=1 . . . D, so as to generate the simulated value $X_i$ (or just $x_i'$) of each of the input variables $x_i$ (even those that are not the target variable), except skipping over the one or more controlled (treated or known) variables $x_T$ which are set to their known, fixed values (any edges into those nodes have been "mutilated" away, i.e. removed from the sampled graph). Then, proceeding to the next round (iteration) of the outer loop, the simulated values $X_i$ of the non-controlled variables are fed back to the respective inputs of the model 104. In other words (other than for the one or more controlled variables $x_T$), the simulated values $X_i$ from the previous round or cycle (iteration) of the outer loop become the input values $x_i$ of the current iteration of the outer loop to generate an updated set of values for the simulated variables $x_i$. This may be repeated one or more further times, and the simulated values will start to converge (i.e. the difference between the input layer and output layer of the model 104 will get smaller each time). If noise is included the noise is frozen throughout a given inner loop, then re-sampled each outer loop. The total number of iterations of the outer loop may be predetermined, or the outer loop may be iterated until some convergence criterion is met. In embodiments the outer loop is iterated at least D−1 times, which guarantees convergence without needing to evaluate a convergence criterion.

This method advantageously allows causal effects to propagate throughout the graph. For example if $x_1$ causes $x_2$ and $x_2$ causes $x_3$, and an intervention is performed on $x_1$ then the outer loop will be run at least two times to propagate the effect through to $x_3$.

However the method of using an inner and outer loop is not essential. An alternative would be to perform a topological sort of the nodes and propagate effects through in a hierarchical fashion starting from the greatest grandparents or "source nodes" (those which are only causes and not effects). Or as another alternative, though less preferred, it is not necessary to propagate effects through multiple generations and instead only the effects of immediate parents of the target variable may be taken into account.

Extension to Include Latent Confounders

Figure 9:
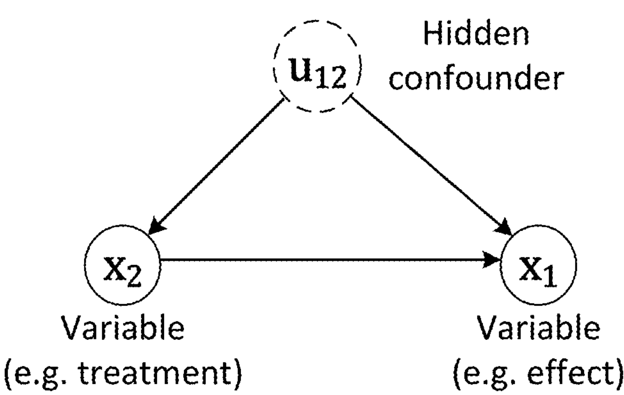
FIG. 9 schematically illustrates a causal graph (or part thereof) including a possible confounder between a pair of variables.

FIG. 9 schematically illustrates the issue of the presence of possible "hidden confounders", which may also be referred to just as confounders. A confounder is a variable that is both A) unobserved (i.e. hidden, so not part of the input feature vector); and B) a cause of at least two variables that are among the variables of the input feature vector $[x_1 \ldots x_D]$. These two variables may be referred to herein as the "confounded" variables or a "confounded pair" of the respective confounder. In the example of FIG. 9 the confounded variables are labelled $x_1$ and $x_2$ and the confounder between them is labelled $u_{12}$. The confounder could be unobservable or merely unobserved. Of course the causal graph may be more complex than shown in FIG. 9, and confounders may exist between more than one pair of variables of the input feature vector.

An issue recognized herein is that existing machine learning models do not take into account the presence of possible confounders, which may lead to an erroneous bias in the training of such models or predictions made by such models. Consider for example a scenario where $x_1$ is a variable measuring the presence or absence of a certain condition (e.g. disease) in a subject (e.g. patient), and $x_2$ is a variable measuring a property of the subject which may or may not affect the possible presence of the condition. For instance $x_2$ could measure a lifestyle factor such as an aspect of the subject's diet (e.g. salt or fat intake, etc.), whether they are a smoker, a dosage of a certain medication they are taking, or an environmental factor such as living in an area of high pollution or near an electricity pylon. Say then that the model is being used to try to learn whether there is a causal link between $x_1$ and $x_2$, or to predict what would be the effect on $x_1$ of treating $x_2$. However there may be an unobserved common cause of the two variables, i.e. a confounder. For instance, the confounder $u_{12}$ could represent a factor in the socioeconomic circumstances of the patient (e.g. annual income, education or family circumstances). Ignoring the confounder (e.g. socioeconomic circumstance) may give the false impression that the lifestyle factor $x_2$ causes the condition $x_1$, whereas in fact the ground truth is that both $x_1$ and $x_2$ are effects of the socioeconomic circumstance, in which case $x_2$ may not actually be a cause of $x_1$ or may only be a weaker cause than it would otherwise appear.

The presently disclosed extension—which in embodiments may be applied as an extension to the previous work by Geffner et al summarised in the Background section—introduces the modelling of possible hidden confounders into a causal machine learning model by introducing a second causal graph sampled from a second graph distribution.

Figure 10:
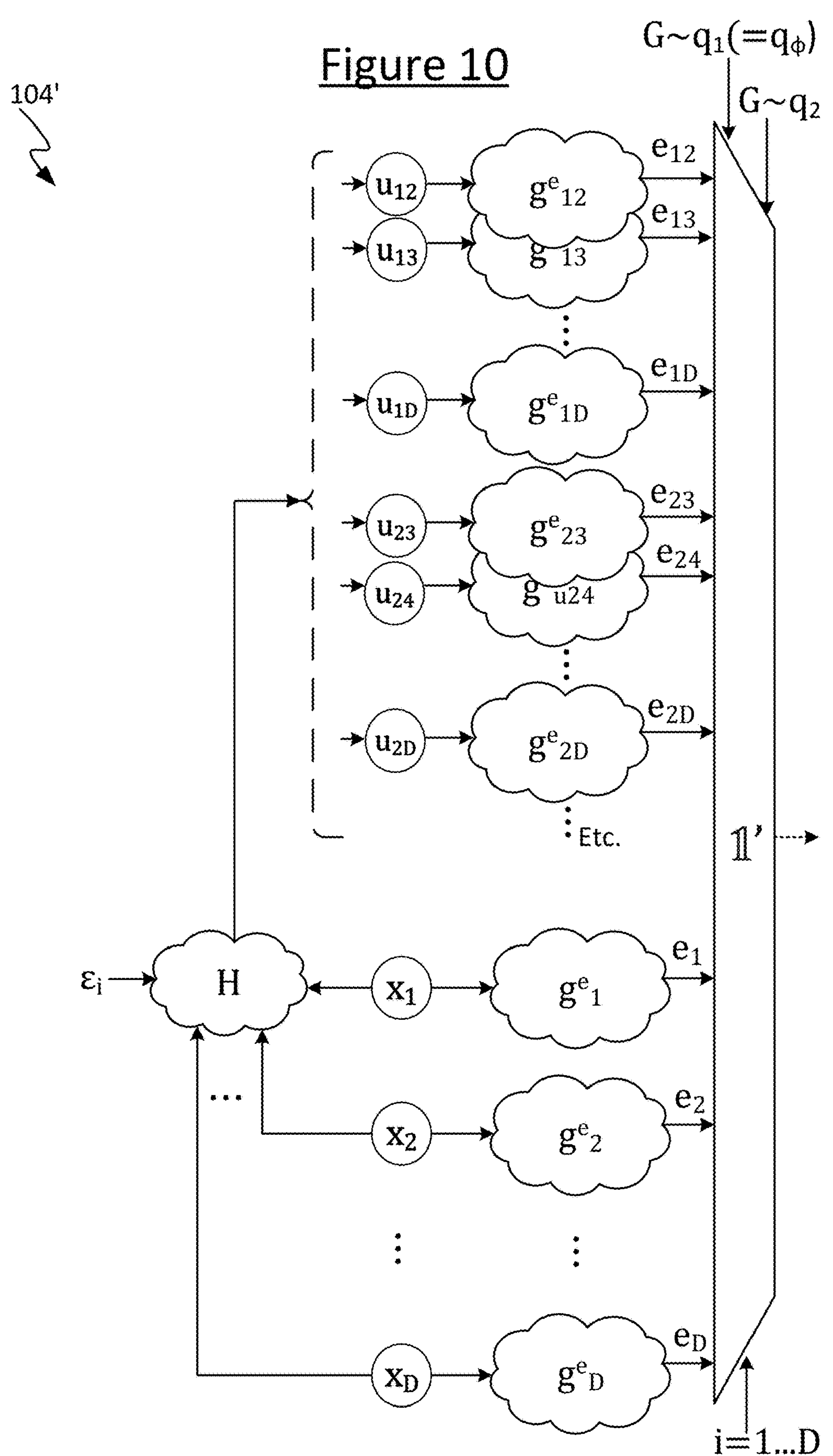
FIG. 10 is a schematic computation diagram illustrating a machine learning model that models the possible presence of hidden confounders in accordance with embodiments disclosed herein.

The extended model works in a similar manner to the model 104 described in relation to FIG. 2 and like elements function in the same manner except where stated otherwise. FIG. 10 schematically illustrates the extension to the model on the encoder side. The decoder side works the same as described in relation to FIG. 2.

As illustrated in FIG. 10, as in the base model 104 of FIG. 2, the extended model 104' comprises a respective first encoder $$g_i^e$$

for each variable $x_i$ (i.e. each feature) of the input feature vector $[x_1 \ldots x_D]$, each arranged to encode the value of its respective variable $x_i$ into a respective embedding $e_i$.

The extended model 104' additionally comprises an inference network H, and a respective second encoder $$g^{e_{ij}}$$

for each of a plurality of pairs of input variables $x_i$, $x_j$ in the input feature vector—preferably one for each possible pair (i.e. every combination of two variables from the input vector). For each of the plurality of pairs of variables $x_i$, $x_j$, the inference network H is arranged to encode the respective values of one or more of the input variables $x_1 \ldots x_D$ (e.g. in training, at least the two respective values of the pair together) into a respective latent value $u_{ij}$ for the respective pair. This latent value represents a modelled value of the (possible) confounder that potentially exists between the respective pair of input variables $x_i$, $x_j$. The inference network H may also be a function of a pseudorandom noise term $\varepsilon_i$. These noises will be added as part of the input. That is, u=H(x, ε), as shown in FIG. 10.

In embodiments, the inference network H is implemented as one common inference network that encodes all the variables $x_1 \ldots x_D$ together into the latent confounder value $u_{ij}$ for a given pair. Alternatively it is not excluded that the inference network H could be structured as a respective constituent inference network H u for each of the plurality of pairs of input variables input variables $x_i$, $x_j$. Other internal structures of H are also possible.

The extended model 104' further comprises a respective second encoder $$g^{e_{ij}}$$

for each respective latent value $u_{ij}$ (corresponding to each respective pair of input variables $x_{ij}$). Each respective second encoder $$g^{e_{ij}}$$

is arranged to encode the respective latent value $u_{ij}$ of the respective confounder into a respective embedding $e_{ij}$.

The extended model 104' comprises a selector 𝟙' analogous to the selector 𝟙 described in relation to the base model of FIG. 2, but with additional functionality. As in FIG. 2, a causal graph $G_\phi$ is sampled from the graph distribution $q_\phi$, and a certain selected variable $x_i$ is selected; and the selector 𝟙' then selects the parent variables $Pa_i$ that are parents of the selected variable $x_i$ according to sampled graph $G_\phi$, and inputs these into the combiner 202 (e.g. adder or concatenator). The graph distribution used for this is the same as the graph distribution $q_\phi$ described previously with respect to FIG. 2. I.e. it comprises matrix whose elements represent the probabilities of directed causal edges existing between the different possible pairs of variables in the input vector $[x_1 \ldots x_i)]$. In the context of the extended model 104', this may also be described as the first graph distribution, or the directed graph distribution; and the graph sampled therefrom may be referred to as the first causal graph or the directed graph. In other words:

$$q_\phi = q_1 = q_{directed}$$

$$G_\phi = G_1 = G_{directed}$$

However, in addition, the extended model 104' also samples a second causal graph $G_2$ from a second graph distribution $q_2$. These may also be referred to herein as the bidirected graph distribution and bidirected graph:

$$q_2 = q_{bidirected}$$

$$G_2 = G_{bidirected}$$

The second graph distribution $q_2$ is a graph distribution representing the probabilities that confounders exist between pairs of variables. It may be expressed as a matrix in which the different elements represent the probabilities that there exists a confounder between different pairs of variables $x_i$, $x_j$, preferably having an entry for each possible pair of variables in the input feature vector $[x_i \ldots x_D]$ (i.e. every combination of two variables from the input vector). So for a simple three variable input vector (D=3), the second graph distribution would have three entries:

ψ_exists12

ψ_exists13

ψ_exists23 where ψ_exists(i,j) represents the probability that a confounder exists between variables with indices i and j. More generally the second graph distribution $q_2$ may be expressed as:

$$q_2 = \begin{pmatrix} \psi\_\text{exists}1,\,1 & & \\ \vdots & \ddots & \\ \psi\_\text{exists}1,\,D & \cdots & \psi\_\text{exists}(D-1),\,D \end{pmatrix}$$

Other equivalent representations may also be possible.

To sample an actual graph $G_2$ from the second graph distribution $q_2$, the presence or absence of each edge in the graph $G_2$ is determined pseudorandomly according to the probability specified in the corresponding element of the distribution $q_2$. E.g. if ψ_exists1,1=0.7, then the element (1,2) in G2—representing whether or not a confounder $u_{12}$ exists between variables $x_1$ and $x_2$—has a 70% chance of being 1 (meaning confounder present) and a 30% chance of being 0 (meaning no confounder present). Again, other equivalent mathematical expressions of the same functionality are also possible. The value of the confounder, if it exists in the sampled graph $G_2$, taken from the output of the inference network H. In embodiments H may be configured to model a probabilistic distribution, which may also be described as a third distribution $q_3$, from which the values of $u_{ij}$ are sampled.

Based on the sampled graphs $G_1$ and $G_2$, in addition to the embeddings $e_i$ of the parents Pa(i) of the selected variable $x_i$ determined from the first causal graph $G_1$ (=$G_{99}$), as sampled from the first graph distribution $q_1$ (=$q_\phi$), the selector 𝟙' also selects the embeddings $e_{ij}$ of any confounded pairs that include the selected variable $x_i$—i.e. of any confounders $u_{ij}$ that affect the selected variable xi—as determined from the second causal graph $G_2$ sampled from the second graph distribution $q_2$. These embeddings $e_{ij}$ of the selected confounders $u_{ij}$ are input into the combiner 202 (e.g. adder or concatenator) along with the embeddings $e_i$ of the parents Pa(i) of the selected variable $x_i$. The combiner 202 then combines (i.e. sums or concatenates, depending on implementation) all of the embeddings $e_i$ of the selected parents and the embeddings $e_{ij}$ of the selected confounders together into a combined embedding $e_C$.

As shown in FIG. 2, the combined embedding $e_c$ is then input into the decoder $$g^{d_i}$$

associated with the selected variable $x_i$, which decodes the combined embedding to produce a respective reconstructed value $x_i'$ of the input variable $x_i$. Optionally the pseudorandom noise $z_i$ may be added (or included in some other, non-additive way) to create the noisy reconstructed value $X_i$. Either may be used as the simulated value of $x_i$. This side of the model 104' (the decoder side) works the same as in the base model 104, as described previously with respect to FIG. 2.

It will be appreciated that the inference network H, second encoders $g^e_{ij}$, and selector $\mathbb{1}'$ may be implemented as modules of software in a similar manner to the other components as described in relation to the model of FIG. 2. As with the first encoders $$g^{e_i}$$

and decoders $g^d_i$, each of the inference network H and second encoders $$g^{e_{ij}}$$

may be implemented as a respective neural network, or alternatively other types of constituent ML models such as random forests or clustering algorithms, or any other form of parametric or non-parametric function, are not excluded.

Figure 11:
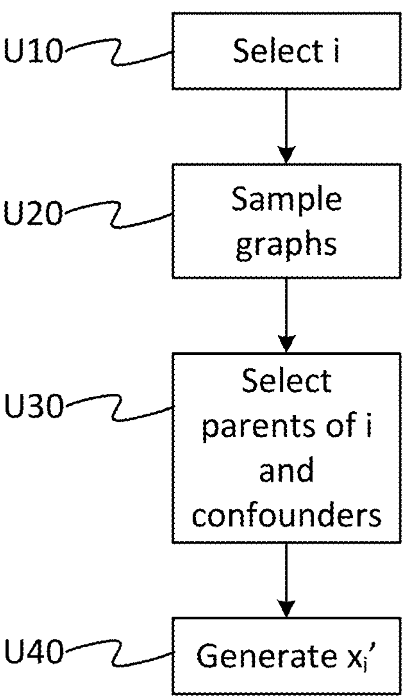
FIG. 11 is a schematic flow chart showing the core functionality of the model of FIG. 10.

The core functionality of the extended model 104' is represented in the flow chart of FIG. 11. By core functionality here, it is meant the mechanism of the model for sampling a causal graph that includes latent confounders, identifying parents of a selected variable according to the sampled graph, including any confounders, and then combining and decoding the embeddings of the identified parents, including the embeddings of any confounders. This mechanism may be used in both training and in subsequent treatment effect estimation.

At step U10 the method selects one of the variables $x_i$ from among the features of the input feature vector $[x_1 \ldots x_d]$. When used in training this variable $x_i$ is one of the variables to be reconstructed in order to determine a loss effect. When used in treatment effect estimation the selected variable $x_i$ will be the target variable, and the intervened-on variable (i.e. variable to be treated) will also be selected separately (though may be null). At step U20 the method samples a first causal graph $G_1$ from the first graph distribution $q_1$ and samples a second causal graph $G_2$ from the second graph distribution $q_2$. At step U30 the method determines which of the other variables $[x_1 \ldots x_{i-1}, x_{i+1} \ldots x_D]$ in the feature vector are parents Pa(i) of the selected variable $x_i$ in the sampled first graph $G_1$. Note this may involve mutilating the graph as described previously. The method also determines which of these parents Pa(i) share a confounder $u_{ij}$ with the selected variable $x_i$ in the sampled second graph $G_2$. In general this could be none, one, some or all of the parents Pa(i) identified from the first graph $G_1$.

At step U40 the method generates the reconstructed value $$x_i'$$

of the selected variable $x_i$. This is done by inputting the input values of each of the selected parents Pa(i) (as determined from the first graph $G_1$) into the respective first encoders $g^e_i$, in order to generate their respective embeddings $e_i$; and inputting at least the input value of the parent in each selected confounded pair $x_i$, $x_j$ (as determined from the second graph $G_2$) into the inference network H to generate the respective latent value $u_{ij}$, and inputting this into the respective second encoder $g^{e_{ij}}$ for the respective confounder in order to generate the respective embedding $e_{ij}$ for each respective pair of confounded variables. In some circumstances, the values input into the inference network H to generate the latent value $u_{ij}$ for a confounded pair i,j (and in turn the respective embedding $e_{ij}$) may also comprise one or more additional input values in addition to the parent of the respective pair. E.g. in training these one or more additional input values preferably comprise the observed input value of the selected variable as well. And in training or inference (e.g. treatment effect estimation), the one or more additional input values may comprise input values of one or more other of the variables of the feature vector $\{x_1 \ldots x_D\}$ (other than the selected variable $x_i$ or the respective parent $x_j$ of the pair i,j), as one or more of these variables may potentially also comprise information about the possible confounder. In general, H can generate $u_{ij}$ for the selected variable $x_i$ based on what is known about any or all of the other variables. The more is known, the better that H will predict $u_{ij}$. One (of many) ways to it is to take the average: $H(x_j)$=sum over $x_i\{H(x_i,x_j)*p(x_j)\}$. So H can generate $u_{ij}$ from only a specified value of the parent $x_j$. H can even generate $u_{ij}$ given nothing as input, meaning H is just generating $u_{ij}$ randomly from a distribution learned at training. When estimating average treatment effects, this is acceptable, since in the one will marginalize out all the variables x in the entire population anyway.

Continuing step U40, all the generated embeddings $e_i$; $e_{i,j}$ for the selected parents and confounders are input into the combiner 202 to be combined (e.g. summed or concatenated) into the combined embedding $e_C$, which is then decoded by the respective decoder $$g_i^d$$

for the selected variable $x_i$ to produce the respective reconstructed value $$x_i'.$$

Optionally a noise term $z_i$ may be added to produce the simulated value $X_i$. Alternatively the noiseless reconstructed value $$x_i'$$

could be used as the simulated value.

It will be appreciated that FIG. 11 is somewhat schematized and all the steps of FIG. 11 do not necessarily have to be performed linearly. E.g. the method could identify the parents Pa(i) from the first graph and begin generating the parents' embeddings e, before it has begun identifying all of the confounded pairs $x_i$, $x_j$. Or the method could begin generating embeddings for some parents while still selecting other parents from the graph $G_1$, etc.

Training of the model 104' may be performed in an analogous manner to that already described in relation to FIGS. 2 and 7, by replacing steps S30-S70 in FIG. 7 with steps U10-U40 from FIG. 11. In other words, training begins with a given training data point comprising a set of respective values of at least some the variables (features) of the feature vector $x_i=[x_1 \ldots x_D)]$. Preferably this will be values of all the variables of the feature vector if available, but the function H can take any number of observations as input, so if one or more values are unobserved then they are simply not passed through H. The method then cycles through the indices of each variable i=1 . . . D observed in the feature vector, and for each performs the method of FIG. 11 with the current variable as the selected variable in order to produce a respective simulated value $$x_i' \text{ or } X_i.$$

Over the cycle, the method will thus produce a simulated value $$x_i' \text{ or } X_i$$

for each variable in the feature vector (or at least those that are observed), which together thus result in a simulated feature vector $$\underline{x_i'} = [x_i' \ \ldots \ x_D'] \text{ or } \underline{X_i} = [X_1 \ \ldots \ X_D].$$

The method then determines a measure of the discrepancy between the input feature vector $x_i$ and the simulated feature vector $$\underline{x_i'} \text{ or } \underline{X_i}$$

for the given training data point, and based on this tunes the parameters (e.g. weights) of all the constituent models (e.g. neural networks) of the ML model 104', including the first encoders $$g_i^e,$$

second encoders $$g_{ij}^e,$$

inference network H, and decoders $$g_i^d,$$

as well as the first and second graph distributions $q_1$ and $q_2$. E.g. this may be done using an ELBO function, or any other suitable learning function. Algorithms for comparing an input feature vector with a simulated version in order to tune the parameters of a ML model are, in themselves, known in the art. The method may be repeated over multiple training data points in order to refine the training.

Once the model 104' has been trained to at least some extent, it may be used to estimate whether a likely confounder exists between a given target pair of variables $x_i$, $x_j$ (i.e. a pair of variables of interest). This may be done by accessing the trained second graph distribution $q_2$ from memory and reading out the value of the probability ψ_exists(i,j). If the probability is high (e.g. above a threshold) it may be determined that an unobserved confounder is likely to exist between the two variables $x_i$ and $x_j$, whereas conversely, if the probability is low (e.g. below a threshold) it may be determined that such a confounder is not likely to exists between the variables in question.

In dependence on this, a decision may be made as to whether or not to action a treatment on a first, intervened-on one of the two variables $x_j$ as a means of affecting a second, targeted one of the two variables $x_i$. Consider a scenario where $x_j$ is a apparently cause of $x_i$ according to the first graph distribution $q_1$, because the relevant elements—e.g. ϕ_exists(l,k), ϕ_dir(i,j)—of the first graph distribution $q_1$ have been read out from memory and indicate a high probability (e.g. above a threshold probability) of a directed edge existing from $x_j$ to $x_i$. Thus from the first graph distribution $q_1$ alone, it may appear that treating $x_j$ is an effective way of affecting $x_i$. However, if ψ_exists(i,j) in the second graph distribution $q_2$ also indicates a high probability (e.g. above a threshold probability) of a hidden confounder existing between $x_j$ and $x_i$, then it may be determined that in fact $x_j$ should not be treated as a means of affecting target variable $x_i$.

The trained model 104' may also be used to estimate the value of such a confounder. This may be done by reading out the value of $u_{ij}$ from the output of the inference network after a suitable amount of training. In embodiments the inference network H may model a probabilistic distribution, which could also be described as $q_3$, from which the value $u_{ij}$ is sampled. The decision as to whether to action the treatment may also be dependent on the value of the estimated confounder. E.g. if a confounder is determined likely to be present but having a weak effect, it may be decided still to action the treatment of $x_j$ as a means of affecting target variable $x_i$.

In alternative or additional applications, the trained model 104' may be used to perform treatment effect estimation in an analogous manner to that already described in relation to FIGS. 2 and 8, by replacing steps T10-T40 in FIG. 8 with steps U10-U40 from FIG. 11. In other words, the target variable is selected as the selected variable $x_i$, and input values of one or more other, intervened-on (i.e. controlled)

variables $x_j$ is/are set to its/their intended value (i.e. the proposed value for treatment). As discussed earlier the inference network H can take any number of observations, so if any variables are not intervened-on or observed, their values are simply not passed through H. The method of FIG. 11 is then used to generate a simulated value $$x_i' \text{ or } X_i$$

of the target variable $x_i$. In embodiments this may be repeated over multiple different sampled instances of the first and second causal graphs $G_1$, $G_2$; i.e. repeating the steps of FIG. 11 but newly re-sampling the first causal graph $G_1$ from the first graph distribution $q_1$ and the re-sampling the second causal graph $G_2$ from the second graph distribution $q_2$ afresh each time (while keeping the same selection of the target variable and the same fixed values of the intervened on variable or variables $x_j$). The estimated effect of the treatment may then be determined by averaging over these multiple rounds of graph sampling. E.g. this may comprise determining the average treatment effect (ATE) or any other averaging technique described previously with respect to FIGS. 2 and 8.

A decision about whether or not to action the proposed treatment of the (to-be) intervened-on variable or variables $x_j$ may be made in dependence on the estimated treatment effect. If the treatment is determined to be effective and to have a positive effect on the target variable $x_i$ (e.g. having above a threshold effect), then the treatment may be actioned; but otherwise the treatment may not be actioned.

Example Use Cases

The variables of the feature vector $x_i=[x_1 \ldots x_D]$ may represent properties of a tangible real-world entity being modelled, or an environment in which the entity resides. The entity may comprise a living being; or a physical object such as an electronic, electrical or mechanical device or system. Alternatively or additionally the object may comprise a piece of software running or to be run on a computer system.

In one example use case, the modelled real-world entity may comprise a living being, e.g. a human or animal. The disclosed model 104 or 104' may be used to determine whether to action a treatment to the being in order to affect a condition of the being (e.g. to cure or alleviate a disease by which the being is afflicted). In this case the target variable $x_i$ represents a measure of the condition, e.g. a symptom experienced by the living being as a result of the condition, and one or more intervened-on variables $x_j$ represent one or more properties of the being or its environment which are susceptible to being controlled as a treatment (e.g. dosage of a drug, or a change in habit or environment, etc.). E.g. this may be used in a medical setting to treat a patient. A decision as to whether to perform the proposed treatment on the intervened-on variable(s) as a means to treat the target condition may be made in dependence on whether a confounder is estimated to exist between the proposed treatment and the target condition, and/or an estimate strength of the confounder. And/or, the decision may be made in dependence on the estimated treatment effect, e.g. ATE.

In another example use case, the real-world entity may comprise a mechanical, electrical or electronic system or device; and the disclosed model 104 or 104' may be used to determine whether to action a treatment to affect a state of the system or device, such as to repair, maintain or debug the system or device. In this case the target variable $x_i$ may represent a measure of the state of the system or device, e.g. sensor data measuring wear, operating temperature, operating voltage, output or throughput, etc. The one or more intervened-on variables $x_j$ may represent one or more properties of the device or its environment susceptible to being treated, e.g. vibration, humidity, ambient temperature, applied current or voltage level, etc. E.g. this could be used in an industrial setting to service industrial equipment such as factory equipment. A decision as to whether to perform the proposed treatment on the intervened-on variable(s) as a means to treat the target state may be made in dependence on whether a confounder is estimated to exist between the proposed treatment and the target state, and/or an estimate strength of the confounder. And/or, the decision may be made in dependence on the estimated treatment effect, e.g. ATE.

In another example use case, the real-world entity being modelled may comprise software that is run, or to be run, on one or more processors in one or more computer devices at one or more locations; and the disclosed model 104 or 104' may be used to determine whether to action a treatment to try to optimize the running of the software. In this case the target variable $x_i$ may comprise a measure of a current state of the software, e.g. memory or processing resource usage, or latency, etc. The one or more intervened-on variables $x_j$ may represent any property capable of affecting the running of the software, e.g. input data, or rebalancing or the load across a different combination of processors or devices. For example this could be used in a data centre or the cloud for load balancing of software run across different server devices. A decision as to whether to perform the proposed treatment on the intervened-on variable(s) as a means to optimize the running of the software may be made in dependence on whether a confounder is estimated to exist between the proposed treatment and the target state, and/or an estimate strength of the confounder. And/or, the decision may be made in dependence on the estimated treatment effect, e.g. ATE.

In another example use case the real-world entity being modelled may comprise a network, e.g. a mobile cellular network, a private intranet, or part of the internet (e.g. an overlay network such as a VoIP network overlaid on the network). The disclosed model 104 or 104' may be used to determine whether to action a treatment to try to optimize the operation of the network. In this case the target variable $x_i$ may represent any state of the network that it may be wished to improve, e.g. a property of network traffic such as end-to-end delay, jitter, packet loss, error rate, etc. The one or more intervened-on variables $x_j$ may represent and property capable of affecting the target variable, e.g. balancing of traffic across the network, routing or timing of traffic, encoding scheme used, etc. A decision as to whether to perform the proposed treatment on the intervened-on variable(s) as a means to optimize the network performance may be made in dependence on whether a confounder is estimated to exist between the proposed treatment and the target state, and/or an estimate strength of the confounder. And/or, the decision may be made in dependence on the estimated treatment effect, e.g. ATE.

In another example use case, the real-world entity may comprise an autonomous or semi-autonomous self-locomotive device such as a self-driving vehicle or robot. In this case the target variable $x_i$ may represent sensor data providing information on the device's environment, e.g. image data or other sensor data (such as distance or motion sensor data) providing information on the environment of the device (such as presence of obstacles, location of another object to interact with). The one or more intervened-on variables $x_j$ may comprise a control signal that can be applied to control the device, e.g. to steer the vehicle or apply brakes or lights, or to move a robot arm in a certain way. A decision as to whether to perform a certain control operation (a type of "treatment") represented by the intervened-on variable, as a means to achieve a certain effect on the environment (e.g. avoid an obstacle or interact with another object), may be made in dependence on whether a confounder is estimated to exist between the proposed variable to be controlled and the target outcome, and/or an estimate strength of the confounder. And/or, the decision may be made in dependence on the estimated treatment effect, e.g. ATE.

Example Implementation

Further details of some example implementations of the various concepts discussed above are now described, by way of example only.

As discussed earlier, in practice it is not always possible to directly perform interventional studies (i.e., randomised AB testings) to estimate treatment effects, and it may be required to use observational studies. That is, the causal graph and the associated causal effects are to be inferred based on observational data, in embodiments solely based on observational data. Therefore, this would appear to require an assumption that all the data provided by users already contains all the information that is needed (i.e. there should not be any unmeasured confounders). However, this assumption is often unrealistic, as the modelled scenario is also impacted by certain variables that cannot be directly measured.

Therefore, it would be desirable to provide an effective and theoretically principled strategy for handling latent confoundings when performing joint causal discovery & inference. However, the existence of unmeasured confounding poses questions for causal discovery since there might exist multiple contradicting causal structures that are compatible with observations. Traditional methods for causal discovery mainly focus on estimating the causal relationships between observed variables and does not recover the causal relationships that involve unmeasured confounders. There also exists several related methods for causal discovery with latent confounders, but each comes with certain limitations on assumptions. Following the previous work by Geffner at al of developing deep end-to-end causal inference (DECI), this framework can be extended in order to handle latent confounders. The outcomes of this is to implement latent variable variants/baselines of DECI that explicitly take latent confounders into account. These variants/baselines should preferably: 1), be able to perform joint graph learning and functional learning; 2), have computational costs comparable to DECI; and 3), subsume DECI, in the sense that it should perform similarly to DECI when there is no latent confounders.

To recap the causal discovery without latent confounders using DECI, recall that in DECI, we perform causal discovery under no latent confounder assumptions, but modelling the causal graph G on all observed vertexes X jointly with the observations $x^1, \ldots x^N$ as:

$$p_\theta(x^1, \ldots, x^N, G) = p(G)\prod_n p_\theta(x^n|G) \quad (1)$$

Here, p(G) is a prior over DAG, implemented by:

$$p(G) \propto \exp\left(-\lambda_s\|G\|_F^2 - \rho h(G)^2 - \alpha h(G)\right) \quad (2)$$

where G is the adjacency matrix representation, and $$h(G)=tr(e^{G\odot G})-D \quad (3)$$

is the DAG penalty.

We aim to fit θ, the parameters of our non-linear ANM, using observational data by maximizing (an lower bound of) $\log p_\theta(x^1, \ldots, x^N)$. Given θ, the question of causal discovery can be simply answered by the posterior, $p_\theta(G|x^1, \ldots, x^N)$. In the original DECI, we maximize the ELBO of $\log p_\theta(x^1, \ldots, x^N)$ and use mean-field approximation $q\varphi(G)$ to perform approximate inference.

Causal discovery under ADMGs: in the present disclosure, we will extend DECI's framework to consider unmeasured confounders. Unfortunately, if some variables in a DAG is unobserved, the resulting set of (conditional) independences no longer corresponds to a DAG (on the observed variables).

To deal with unobserved variables, a common extension is the so called acyclic directed mixed graphs (ADMGs). In a ADMGs, a bidirected edge $x\leftrightarrow y$ indicates the existence of a unmeasured founder $u_{xy}$, such that $x\leftarrow u_{xy}\rightarrow y$. Note that this would be different than a undirected edge x–y used in (CP)DAG, which indicates either $x\leftarrow y$ or $x\rightarrow y$. Finally, the term acyclic in ADMG means that there is no cycles that contains only directed edges.

Therefore, causal discovery under latent confounders can be formulated as the same equation as the original DECI, $$p_\theta(x^1, \ldots, x^N, G) = p(G)\prod_n p_\theta(x^n|G) \quad (4)$$

except that the prior p(G) will be based on the constraint that G is a ADMG (instead of a DAG). We will discuss how to parameterize the ADMG constraint and how to parameterize $p_\theta(x^1, \ldots, x^N, G)$ later.

Note that in principle, an ADMG causal discovery algorithm is able to express search results using (a subset of) the following structures:

$x\rightarrow y$: x is the cause of y;

$x\leftrightarrow y$: indicates the existence of a unmeasured founder $u_{xy}$, such that $x\leftarrow u_{xy}\rightarrow y$.

x–y: either $x\leftarrow y$ or $x\rightarrow y$.

$x\Rightarrow y$: either $x\leftrightarrow y$, or $x\rightarrow y$.

In the following, we mainly consider representing our posteriors using the first two, where they have better granularity than the last two.

D-DECI (Deconfounded DECI)

Magnification-based representation: We perform causal discovery on the highest granularity, i.e. explicitly model the latent confounders (denoted by U), and learn a DAG G' on $X\cup U$. In other words, G' (on $X\cup U$) is a magnification of G (on X); and the marginalized graph G over observed variables X will then be a ADMG. To relate G' to the previous notation of $G_1$ and $G_2$, $G_1$ is the adjacency matrix on X; and $G_2$ is the adjacency matrix on U. G' is basically a big matrix on both X and U, obtained by concatenating and unpacking $G_1$ and $G_2$. In other words, $G'=M(G_1, G_2)$, where $M(\cdot)$ is a pre-known mathematical function. G' may also be called magnified matrix. In short, it is obtained by concatenating and aggregating $G_1$ and $G_2$. For example, for a graph $x_1$-->$x_2$<-->$x_3$, the corresponding matrices will be:

$$G_1 = \begin{pmatrix} 0 & 1 & 0 \\ 0 & 0 & 0 \\ 0 & 0 & 0 \end{pmatrix}$$

$$G_2 = \begin{pmatrix} 0 & 0 & 0 \\ 0 & 0 & 1 \\ 0 & 1 & 0 \end{pmatrix}$$

$$G' = \begin{pmatrix} 0 & 1 & 0 & 0 \\ 0 & 0 & 0 & 0 \\ 0 & 0 & 0 & 0 \\ 0 & 1 & 1 & 0 \end{pmatrix}$$

where the 4th row of G' corresponds to the 4th variable (additional latent confounder) implied in the bidirected edge $x_2$<-->$x_3$. That is, the 4th variable should point to both $x_2$ and $x_3$, hence those two 1s in the second and third cell of the 4th row.

Under this idea, we model the causal graph G' jointly with the observations $x^1, \ldots x^N$, as well as latent confounders $u^1, \ldots, u^N$:

$$p_\theta(x^1, \ldots, x^N, u^1, \ldots, u^N, G') = p(G')\prod_n p_\theta(x^n, u^n|G') \tag{5}$$

We will define constraints on G' and the parameterization of $p_\theta(x^n, u^n|G')$ later. We call Eq. (5) magnification-based parameterization, since the original ADMGs formulation does not explicitly assume any functional forms. To optimize θ and perform approximate inference on G', we define:

1) A variational distribution $q_\varphi(G)$ to approximate the intractable posterior $p_\theta(G|x^1, \ldots x^N)$. Similar to the original DECI, this can be parametrized as the product of independent Bernoulli distributions for each potential directed edge in G'. We parametrize edge existence and edge orientation separately, using the ENCO parametrization.
2) An inference network $q_\lambda(u|x)$ to approximate the intractable posterior $p_\theta$, G'(u|x), e.g., a Gaussian inference network used in VAEs. The inference network $q_\lambda(u|x)$ has also been referred to as H earlier.

We use them to build the ELBO, given by:

$$ELBO(\theta, \phi, \lambda) = \mathbb{E}_{q_\phi(G)q_\lambda(u|x)}\left[\log\frac{p(G)\prod_n p_\theta(x^n, u^n|G)}{q_\phi(G)\prod_n q_\lambda(u^n|x^n)}\right] \le \log p_\theta(x^1, \ldots, x^N) \tag{6}$$

By committing to optimize Eq. (6), we implicitly make the following assumptions:

We already know the exact number of unmeasured variables. That is, the latent vertexes U is given and fixed.

For all unmeasured variables in U, they only possess out-going edges. That is, all variables U serve as confounders. This in practice and be implemented by model.set graph constraint( ) in DECI code base.

Prior over ADMGs: The ADMG constraint on the graph G' can be imposed in two ways:

Directly apply the DAG constraint on G'. That is, $$h(G')=tr(e^{G'\odot G'})-D=0 \tag{7}$$

This ensures that once G' can be converted to an ADMG (by marginalizing U and only keeping X).

OR

First marginalize G' to the graph G on X, and then apply ADMG constraints on G. This can be done via the following three ADMG constraints:

Ancestral ADMG constraint:

$$h(G)=tr(e^D)-D+\Sigma(e^{G_{directed}}\odot G_{bidirected})=0 \tag{8}$$

where $G_{directed,i,j}=1$ if and only if $x_i \leftarrow x_j$; and $G_{bidirected,i,j}=1=G$ if and only if $x_i \leftrightarrow x_j$.

Arid ADMG constraint:

$$h(G)=tr(e^D)-D+\text{GREENERY}(G_{directed}, G_{bidirected})=0 \tag{9}$$

Bow-free constraint:

$$h(G)=tr(e^D)-D+(G_{directed}\odot G_{bidirected})=0 \tag{10}$$

By using any of those constraints, p(G') can be implemented by:

$$p(G') \propto \exp\left(-\lambda_s\|G'\|_F^2 - \rho h(G')^2 - \alpha h(G')\right) \tag{11}$$

Parameterization of $p_\theta(x^n, u^n|G')$: Similar to DECI, we can parameterize $p_\theta(x^n, u^n|G')$ using auto-regressive ANM. That is, $z=g_{G'}(x, u; \theta)=[x, u]-f_{G'}Q([x, u]; \theta)$. Where z are independent noise variables following the distribution $\Pi_i p_{zi}$. Then we can write the observational likelihood as:

$$p_\theta(x^n, u^n|G') = p_Z(g'_G([x^n, u^n]; \theta)) = \prod_{i=1}^{D} p_{Z_i}(g'_G([x^n, u^n]; \theta)_i) \tag{12}$$

where we omitted the Jacobian-determinant term because it is always equal to one for DAGs G'.

Structural identifiability under latent confounders: Preferably, we would like to find a set of suitable assumptions such that D-DECI should satisfy the structural identifiability definition, as follows.

Definition 1 (D-DECI Structural Identifiability). For a distribution $p_\theta(x;G'):=\int_u p\theta(x, u|G')du$, the graph G' is said to be structural identifiable from $p_\theta(x;G')$ if there exists no other distribution $p_{\theta'}(x;G'')$ such that G'≠G'' and $p_\theta(x;G')=p_{\theta'}(x;G'')$.

Generally, such structural identifiability does not hold. However, under the constraint of bow-freeness, we will be prove identifiability, which will be discussed in the next section.

D-DECI Identifiability

Notation and assumptions: Let $x\in\mathbb{R}^D$ denote the observed data, $u\in\mathbb{R}^P$ denote the unobserved data, $v=[x; u]^T$, and $p(x, u; \mathcal{G}^0)$ the ground truth data generating distribution, where $\mathcal{G}^0$ is a binary adjacency matrix representing the true causal DAG. DDECI uses the additive noise model (ANM) defining the structural assignment $x_j'=f_j(pa(j); \theta)+n_j$ where pa(j) denotes the parents of $x_j$. The function f corresponds to the decoders $g^d$ described earlier. We'll also use the notation $pa_x(j)$ and $pa_u(j)$ to denote the parents of $x_j$ in the observed and unobserved set, respectively. $n_j$ are mutually independent noise variables. The noise term n has also been referred to as z earlier.

Assumption 1 (Form of $f_j$): We assume that the functions $f_j$ are non-linear and decompose as:

$$f_j(pa_x(j),pa_u(j);\theta)=f_{j,x}(pa_x(j);\theta)+f_{j,u}(pa_u(j);\theta) \tag{13}$$

Assumption 2 (Unobserved variables are latent confounders): All unobserved variables are latent confounders of observed variables, i.e. have the causal structure $x_j \leftarrow u_k \rightarrow x_i$. Justification of this is given by the proposition that any latent variable can be reparameterised by absorbing exogenous noise to make it a latent confounder. A distribution p(x) satisfies minimality w.r.t. $\mathcal{G}$ if it is Markov w.r.t. $\mathcal{G}$, but no to any proper subgraph of $\mathcal{G}$. Since we cannot access the true data generating distribution $p(x, u; \mathcal{G}^0)$, only the marginal distribution over observed variables $p(x; \mathcal{G}^0)$, we require a slightly different definition of minimality. We define this below.

Definition 1 (Minimality): $p(x; \mathcal{G})$ is minimal if it does not satisfy the local Markov condition with respect to the ADMG of any subgraph of $\mathcal{G}$. This form of minimality implies the bow-free constraint. To see this, note that the causal structure $x_i \leftarrow u_k \rightarrow x_1$ together with $x_i \leftarrow x_j$, and $x_i \leftarrow u_k \rightarrow x_1$ alone imply the same conditional independencies. Since the latter is a subgraph of the former, only it satisfies the minimality condition.

Assumption 3 (Minimality): For a distribution $p(x; \mathcal{G})$ generated by D-DECI, we assume the minimality condition holds.

Comments on assumption of latent variables: Treatment effect is invariant to parameterisations if intervening on observed variables only.

Proof of structural identifiability: Here we prove structural identifiability of $\mathcal{G}$ given the assumptions of the previous section.

Lemma 1: Let M denote a set of variables not containing $v_i$, and let $s(v_i)$ denote a linear or nonlinear function of $v_i$. Then, the residual of $s(v_i)$ regressed on M cannot be independent of $n_i$:

$$\forall M \subseteq V \backslash \{v_i\}, g_i, [s(v_i) - g_i(M) \not\perp\!\!\!\perp n_i] \tag{14}$$

Proof: Assume that $[s(v_i) - g_i(M) \perp\!\!\!\perp n_i]$ holds, then M must contain at least one descendent of $v_i$ as it must have dependence on the noise $n_i$ to cancel effect of $n_i$ in $s(v_i)$. We can express $g_i(M)$ as $u_i(\cup_{j:v_j \in M} n_j \cup n_i)$. Since $g_i$ operates on variables defined by non-linear transformations of the exogenous noise terms, we cannot express $u_i$ as $a_i(\cup_{j:v_j \in M} n_j) + b_i(n_i)$. M contains a descendent of $v_i$, so $\cup_{j:v_j \in M} \cup n_i$ includes at least one noise term $n_k$ that satisfies $v_i \not\perp\!\!\!\perp n_k$ (i.e. is not in $v_i$). Thus, terms containing $n_i$ cannot be fully removed from $s(v_i) - g_i(M)$ and so $[s(v_i) - g_i(M) \perp\!\!\!\perp n_i]$ does not hold.

Lemma 2: If an only if is satisfied, there is a latent confounder, and no direct cause, between $x_i$ and $x_j$.

$$\forall g_i, g_j, M \subseteq (X \backslash \{x_i\}), N \subseteq (X \backslash \{x_j\}), [x_i - g_i(M) \not\perp\!\!\!\perp (x_j - g_j(N)] \tag{15}$$

Proof: Define $g_i$ and $g_j$ as $g_i(M) = f_{i,x}(pa_x(i)) + g'_i(M)$ and $g_j(N) = f_{j,x}(pa_x(j)) + g'_i(N)$ respectively. Then, (15) becomes equivalent to:

$$[(f_{i,u}(pa_u(i)) + n_i - g'_i(M)(f_{j,u}(pa_u(j)) + n_j - g'_j(N)] \tag{16}$$

This is equivalent to:

$$(f_{i,u}(pa_u(i)) + n_i)(f_{j,u}(pa_u(j)) + n_j) \tag{17}$$

And since $n_i \not\perp\!\!\!\perp n_j$, we have:

$$(f_{i,u}(pa_u(i))n_j) \vee (n_i f_{j,u}(pa_u(j))) \vee (f_{i,u}(pa_u(i)) f_{j,u}(pa_u(j))) \tag{18}$$

The first implies the existence of an unobserved mediator between $x_j$ and $x_i$, the second implies the existence of an unobserved mediator between $x_i$ and $x_j$, and the third implies the existence of an unobserved confounder. Given Assumptions 2 and 3, this indicates the presence of a latent confounder and no direct cause between $x_i$ and $x_j$.

Lemma 3. If (19) is satisfied, there is no causal relationship between $x_i$ and $x_j$ and no latent confounder.

$$\exists g_i, g_j, M \subseteq (X \backslash \{x_i, x_j\}), N \subseteq (X \backslash \{x_i, x_j\}), [x_i - g_i(M) \not\perp\!\!\!\perp (x_j - g_j(N)] \tag{19}$$

Lemma 4. If (20) and (21) are satisfied, $x_j$ is a direct cause of $x_i$ and there is no latent confounder.

$$\forall g_i, g_j, M \subseteq (X \backslash \{x_i, x_j\}), N \subseteq (X \backslash \{x_j\}), [x_i - g_i(M) \not\perp\!\!\!\perp (x_j - g_j(N)] \tag{20}$$

$$\exists g_i, g_j, [(x_i - g_i(M) \not\perp\!\!\!\perp (x_j - g_j(N))] \tag{21}$$

Thus, for any pair of variables we can determine whether there exists a latent confounder, and if not we can determine whether or not there is a direct cause and the orientation.

MLE recovers ground proof: We can use the exact same proof as in the DECI paper to show that MLE recovers ground truth—we can just replace $\mathcal{G}$ with the ADMG corresponding to $\mathcal{G}$ projected onto x.

D-DECI recovers ground truth: In the infinite data limit, we have:

$$\lim_{N\to\infty} \frac{1}{N} \sum_{n=1}^{N} \mathbb{E}_{q_\phi(\mathcal{G})q(u_n|x_n)}[\log p_\theta(x_n, u_n|\mathcal{G})] - \frac{1}{N} \sum_{n=1}^{N} H(q(u_n|x_n)) - \underbrace{\frac{1}{N} KL[q(\mathcal{G}) \| p(\mathcal{G})]}_{\to 0} = \lim_{N\to\infty} \frac{1}{N} \sum_{n=1}^{N} \mathbb{E}_{q_\phi(\mathcal{G})}[\log p_\theta(x_n|\mathcal{G})] - \frac{1}{N} \sum_{n=1}^{N} \mathbb{E}_{q(\mathcal{G})}[KL[q(u_n|x_n) \| p(u_n|x_n, \mathcal{G})]].$$

The posterior approximation $q(u_n|x_n)$ should preferably be very accurate (i.e. $\mathbb{E}_{q(\mathcal{G})}[KL[q(u_n|u_x) \| p(u_n|u_x, \mathcal{G})]] \approx 0$) to recover the ground truth causal structure.

Final Remarks

It will be appreciated that the above embodiments have been described by way of example only.

More generally, according to one aspect disclosed herein there is provided (Statement 1) a computer-implemented method comprising: a) selecting a selected variable from among variables of a feature vector; b) sampling a first causal graph from a first graph distribution and sampling a second causal graph from a second graph distribution, the first causal graph modelling causation between variables in the feature vector, and the second causal graph modelling presence of possible confounders, a confounder being an unobserved cause of both of two variables in the feature vector; c) from among of the variables of the feature vector, identifying a parent variable which is a cause of the selected variable according to the first causal graph, and which together with the selected variable forms a confounded pair having a respective confounder being a cause of both according to the second causal graph; d) inputting an input value of the parent variable into a first encoder, resulting in a respective embedding of the parent variable; e) inputting at least the input value of the parent variable (and optionally also an input value of the selected variable and/or an input value of one or more others of the variables of the feature vector) into an inference network, resulting in a latent value modelling the respective confounder of the confounded pair, and inputting the latent value into a second encoder, resulting in an embedding of the confounder of the confounded pair; f) combining the embedding of the parent variable with the embedding of the confounder of the confounded pair, resulting in a combined embedding; and g) inputting the combined embedding into a decoder, resulting in a reconstructed value of the selected variable.

In embodiments there may optionally be provided a method in accordance with any of the following statements.

Statement 2. The method of Statement 1, wherein c) comprises: identifying each of the variables of the feature vector that is a respective parent variable of the selected variable according to the first causal graph, and identifying each respective confounded pair that comprises the selected variable and a respective one of the identified parent variables according to the second causal graph; d) comprises: inputting a respective input value of each of the parent variables into a respective first encoder for the parent, resulting in a respective embedding of each respective parent variable; e) comprises: for each identified confounded pair, inputting the input value of the respective parent variable and the input value of the selected variable into the inference network, thereby resulting in a respective latent value of each of the respective confounders, and inputting each of the latent values into a respective second encoder for the respective latent value, resulting in a respective embedding of each of the respective confounders; f) comprises combining the embeddings of all the identified parent variables and confounders together, thereby resulting in said combined embedding; and g) comprises inputting the combined embedding into a respective decoder associated with the selected variable, resulting in a reconstructed value of the selected variable.

Statement 3. The method of Statement 2, comprising: i) for a given training data point comprising a given combination of input values of the variables of the feature vector, repeating a)-g) over multiple selections, each selection selecting a different one of the variables of the feature vector as the selected variable thereby resulting in a respective reconstructed value, the multiple selections together thereby resulting in a respective reconstructed version of the training data point comprising the reconstructed values for the training data point; ii) evaluating a measure of difference between the training data point and the reconstructed version; and iii) training parameters of the inference network, first and second encoders, decoders, and first and second graph distributions, based on the evaluated measure.

Statement 4. The method of Statement 3, comprising repeating i)-iii) over multiple input data points, each comprising a different combination of input values of the variables of the feature vector.

Statement 5. The method of Statement 4, comprising, after the training over the multiple training data points, observing the second graph distribution to estimate whether a confounder exists between a target pair of the variables of the feature vector.

Statement 6. The method of Statement 5, comprising, after the training over the multiple training data points, observing the latent value of the respective confounder between the target pair of variables, resulting from the inference network, as an estimated value of the respective confounder.

Statement 7. The method of Statement 5 or 6, wherein the variables of the feature vector model properties of a real-world entity or an environment thereof, and the method comprises, in dependence in said estimating of whether a confounder exists between the target pair of variables, determining whether or not to apply a treatment to one of said target pair of variables to affect the other of said target pair of variables.

Statement 8. The method of Statement 7, wherein one of: the real-world entity comprises a living being, and the treatment comprises a medical treatment to the living being or the environment thereof; or the real-world entity comprises a mechanical, electrical or electronic device or system, or an environment thereof; and the treatment comprises an act of maintaining, debugging, upgrading or controlling the device or system, or controlling the environment thereof; or the real-world entity comprises a network or software, and the treatment comprises an act of controlling the network or software.

Statement 9. The method of any of Statements 2 to 8, comprising: I) setting the input value of an intervened-on variable of the feature vector, other than the selected variable, to a specified value; and II) estimating an effect of the intervened-on variable on the selected variable based on the reconstructed value of the selected variable.

Statement 10. The method of Statement 9, wherein: I) comprises setting the input value of a plurality of intervened-on variables of the feature vector, other than the selected variable, to respective specified values; and II) comprises estimating the effect of the plurality of intervened-on variables based on the reconstructed value of the selected variable.

Statement 11. The method of Statement 9 or 10, wherein: I) comprises repeating a)-g) over multiple graph-sampling events, each using the same selected variable and setting the intervened-on variable to the same specified value, but performing the sampling of the first and second causal graphs afresh each time, thereby resulting in a respective reconstructed value of the selected variable from each graph-sampling events; and II) comprises determining an average treatment affect of the intervened-on variable on the selected variable averaged over the multiple graph-sampling events.

Statement 12. The method of Statement 11, wherein each graph-sampling event sets a plurality of intervened-on values to specified values, the same values each time; and II) comprises determining the average treatment effect of the plurality of intervened-on variables on the selected variable.

Statement 13. The method of Statement 9, wherein the intervened-on variable models a treatment on a real-world entity or an environment thereof and the target variable models an effect of the treatment applied to the real-world entity, and the method further comprises actioning the treatment on the real-world entity in dependence on the estimated treatment effect.

Statement 14. The method of Statement 13, wherein one of: the real-world entity comprises a living being, and the treatment comprises a medical treatment to the living being or an environment thereof; or the real-world entity comprises a mechanical, electrical or electronic device or system, or an environment thereof; and the treatment comprises an act of maintaining, debugging, upgrading or controlling the device or system, or controlling the environment thereof; or the real-world entity comprises a network or software, and the treatment comprises an act of controlling the network or software.

Statement 15. The method of any of Statements 2 to 14, wherein the inference network comprises a respective constituent inference network for each pair of variables in the feature vector, and e) comprises: for each identified confounded pair, inputting the input value of the respective parent variable and the input value of the selected variable into the respective inference network for the respective confounded pair, thereby resulting in the respective latent value of the respective confounder. Alternatively the inference network may comprise a common inference network operable to encode all the variables of the feature vector together into the respective latent for each pair.

Statement 16. The method of any of Statements 2 to 15, wherein each of the first and second encoders and each of the decoders comprises a neural network.

Statement 17. The method of any of Statements 1 to 16, wherein the inference network comprises a neural network.

Statement 18. The method of Statement 9 or any subsequent Statement when dependent thereon, wherein the method is performed on a server system of a first party, the server system comprising one or more server units at one or more sites; and the method further comprises, by the server system of the first party: providing an application programming interface, API, enabling a second party to contact the server system via a network; receiving a request from the second party over the network via the API; in response to the request, determining the estimated treatment effect on the target variable; and returning the estimated treatment effect to the second party over the network via the API.

According to another aspect disclosed herein, there is provided a computer program embodied on computer-readable storage, wherein the computer program comprises a machine learning model comprising a plurality of first encoders, a plurality of second encoders, a decoder and an inference network; and wherein the computer-program further comprises instructions configured so as when run on one or more processors to perform the method of any preceding Statement.

According to another aspect disclosed herein, there is provided a system comprising: processing apparatus comprising one or more processors; and memory comprising one or more memory units, wherein the memory stores: a machine learning model comprising the first encoders, second encoders, decoders, and inference network of any preceding Statement; and code arranged to run on the processing apparatus and being configured so as when run to perform the method of any preceding Statement.

In some examples, the model 104/104' and associated computer executable instructions are provided using any computer-readable media that are accessible by the computing equipment 102. Computer-readable media include, for example, computer storage media such as memory and communications media. Computer storage media include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium may be described within the computing equipment 102, it will be appreciated by a person skilled in the art, that, in some examples, the storage is distributed or located remotely and accessed via a network or other communication link (e.g., using a communication interface).

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method comprising, performing:

a first operation comprising selecting a selected variable from among variables of a feature vector;

a second operation comprising sampling a first causal graph from a first graph distribution, wherein the first causal graph models causation between variables in the feature vector;

a third operation comprising sampling a second causal graph from a second graph distribution, wherein the second causal graph models presence of possible confounders, a confounder being an unobserved cause of both of two variables in the feature vector;

a fourth operation comprising identifying, from among the variables of the feature vector, a parent variable which is a cause of the selected variable according to the first causal graph, wherein the parent variable, together with the selected variable, forms a confounded pair having a respective confounder that is a cause of the confounded pair according to the second causal graph;

a fifth operation comprising inputting an input value of the parent variable into a first encoder, resulting in a respective embedding of the parent variable;

a sixth operation comprising inputting the input value of the parent variable into an inference network, resulting in a latent value modelling the respective confounder of the confounded pair;

a seventh operation comprising inputting the latent value into a second encoder, resulting in an embedding of the respective confounder of the confounded pair;

an eighth operation comprising combining the respective embedding of the parent variable with the embedding of the respective confounder of the confounded pair, resulting in a combined embedding;

a ninth operation comprising inputting the combined embedding into a decoder, resulting in a reconstructed value of the selected variable; and a tenth operation comprising updating a parameter of the inference network, the first and second encoders, or the first and second graph distributions based on an evaluated measure of difference between the reconstructed value and an observed value of the selected variable.

2. The method of claim 1, wherein:

the fourth operation further comprises:

identifying an additional parent variable of the feature vector that is a respective parent variable of the selected variable according to the first causal graph; and identifying an additional confounded pair comprising the selected variable and the additional parent variable according to the second causal graph, the additional confounded pair having a corresponding confounder that is a cause of the additional confounded pair;

the fifth operation further comprises inputting a respective input value of the additional parent variable into a respective first encoder for the parent, resulting in a respective embedding of the additional parent variable that is distinct from the respective embedding of the parent variable;

the sixth operation further comprises for the additional confounded pair, inputting the input value of the additional parent variable into the inference network to obtain an additional respective latent value of the corresponding confounder;

the seventh operation further comprises inputting the additional respective latent value into a respective second encoder for the additional respective latent value to obtain a respective embedding of the corresponding confounder that is distinct from the respective embedding of the respective confounder; and wherein the combining of the embeddings in the eighth operation additionally comprises combining the respective embedding of the additional parent variable and the respective embedding of the corresponding confounder.

3. The method of claim 2, further comprising, for a given training data point comprising a combination of input values of the variables of the feature vector, repeating the first through the tenth operation over multiple input variable selections to obtain a respective reconstructed version of the given training data point comprising reconstructed values for the given training data point; wherein:

the measure of difference is evaluated between the given training data point and the reconstructed version of the given training data point; and the updating of the parameter comprises updating parameters of the inference network, first and second encoders, decoders, and first and second graph distributions, based on the measure of difference.

4. The method of claim 3, wherein the first through tenth operations, the evaluating of the measure of difference, and the updating of the parameters are repeated over multiple input data points corresponding to different combinations of input values of the variables of the feature vector.

5. The method of claim 4, further comprising, after the updating of the parameters over the multiple input data points, determining, based on the second graph distribution, whether a target confounder likely exists for a target pair of the variables of the feature vector.

6. The method of claim 5, comprising, after the training over the multiple input data points, observing the latent value of the target confounder as modelling an estimated value of the target confounder.

7. The method of claim 5, wherein:

the variables of the feature vector model properties of a real-world entity or an environment thereof; and the method comprises, in dependence on the determination of whether a target confounder exists between the target pair of variables, determining whether to apply a treatment to one of said target pair of variables to affect a second target pair of variables.

8. The method of claim 7, wherein:

the real-world entity comprises a living being, and the treatment comprises a medical treatment to the living being or the environment thereof; or the real-world entity comprises a mechanical, electrical or electronic device or system, or an environment thereof; and the treatment comprises an act of maintaining, debugging, upgrading or controlling the device or system, or controlling the environment thereof; or the real-world entity comprises a network or software, and the treatment comprises an act of controlling the network or software.

9. The method of claim 2, further comprising:

setting the input value of an intervened-on variable of the feature vector, other than the selected variable, to a specified value; and estimating an effect of the intervened-on variable on the selected variable based on the reconstructed value of the selected variable.

10. The method of claim 9, wherein:

the method further comprises setting an additional input value of an additional intervened-on variable of the feature vector, other than the selected variable, to a respective specified value; and the estimating of the effect of the intervened-on variable further comprises estimating the effect of the additional intervened-on variable based on the reconstructed value of the selected variable.

11. The method of claim 9, wherein:

the setting of the input value of the intervened-on variable comprises repeating the first through tenth operations over multiple graph-sampling events using a consistent selected variable and setting the intervened-on variable to a consistent specified value, the multiple graph-sampling events comprise sampling multiple first and second causal graphs, thereby resulting in a respective reconstructed values of the selected variable from the multiple graph-sampling events; and the estimating of the effect of the intervened-on variable comprises determining an average treatment effect of the intervened-on variable on the selected variable averaged over the multiple graph-sampling events.

12. The method of claim 11, wherein:

each graph-sampling event sets a plurality of intervened-on values to specified values, consistently across the multiple graph-sampling events; and the estimating of the effect of the intervened-on variable comprises determining the average treatment effect of a plurality of intervened-on variables on the selected variable.

13. The method of claim 9, wherein:

the intervened-on variable models a treatment on a real-world entity or an environment thereof;

the selected variable models an effect of the treatment applied to the real-world entity to determine an estimated treatment effect; and the method further comprises actioning the treatment on the real-world entity in dependence on an estimated treatment effect.

14. The method of claim 13, wherein:

the real-world entity comprises a living being, and the treatment comprises a medical treatment to the living being or an environment thereof; or the real-world entity comprises a mechanical, electrical or electronic device or system, or an environment thereof; and the treatment comprises an act of maintaining, debugging, upgrading or controlling the device or system, or controlling the environment thereof; or the real-world entity comprises a network or software, and the treatment comprises an act of controlling the network or software.

15. The method of claim 2, wherein:

the inference network comprises a respective constituent inference network for each pair of variables in the feature vector, and the inputting of the input value of the parent variable into the inference network comprises, for a plurality of identified confounded pairs, inputting the input value of at least the respective parent variable into a respective constituent inference network for the respective confounded pair, thereby resulting in the respective latent value of the respective confounder; or the inference network comprises a common inference network operable to encode all of the variables of the feature vectors together into respective embeddings for the plurality of identified confounded pairs.

16. The method of claim 2, wherein each of the first and second encoders and each of the decoders comprises a neural network.

17. The method of claim 1, wherein the inference network comprises a neural network.

18. The method of claim 9, wherein:

the method is performed on a server system of a first party; and the method further comprises, by the server system of the first party:

providing an application programming interface (API) enabling a second party to contact the server system via a network;

receiving a request from the second party over the network via the API;

in response to the request, performing the estimating of the effect on the selected variable; and returning the effect to the second party over the network via the API.

19. A non-transitory computer-readable storage embodying a computer program, wherein:

the computer program comprises a machine learning model comprising a first encoder, a second encoder, a decoder, and an inference network; and the computer program further comprises instructions configured to cause a processor to perform a method when executed on a processor, the method comprising:

selecting a selected variable from among variables of a feature vector;

sampling a first causal graph from a first graph distribution, wherein the first causal graph models causation between variables in the feature vector;

sampling a second causal graph from a second graph distribution, wherein the second causal graph models presence of possible confounders, a confounder being an unobserved cause of both of two variables in the feature vector;

identifying, from among the variables of the feature vector, a parent variable which is a cause of the selected variable according to the first causal graph, wherein the parent variable, together with the selected variable, forms a confounded pair according to the second causal graph;

inputting an input value of the parent variable into the first encoder, resulting in an embedding of the parent variable;

inputting the input value of the parent variable into the inference network to obtain a latent value modelling the respective confounder;

inputting the latent value into the second encoder to obtain a respective embedding of the respective confounder;

combining the embedding of the parent variable with the embedding of the respective confounder to obtain a combined embedding;

inputting the combined embedding into the decoder, resulting in a reconstructed value of the selected variable; and updating a parameter of the inference network, the first and second encoders, or the first and second graph distributions based on an evaluated measure of difference between the reconstructed value and an observed value of the selected variable.

20. A system comprising:

processing apparatus comprising one or more processors; and memory comprising one or more memory units, wherein the memory stores:

a machine learning model comprising a first encoder, a second encoder, a decoder, and an inference network; and code arranged to run on the processing apparatus and being configured so as when run to perform a method comprising:

selecting a selected variable from among variables of a feature vector;

sampling a first causal graph from a first graph distribution, wherein the first causal graph models causation between variables in the feature vector;

sampling a second causal graph from a second graph distribution, wherein the second causal graph models presence of possible confounders, a confounder being an unobserved cause of both of two variables in the feature vector;

identifying, from among the variables of the feature vector, a parent variable that is a cause of the selected variable according to the first causal graph, wherein the parent variable, together with the selected variable, forms a confounded pair according to the second causal graph;

inputting an input value of the parent variable into the first encoder to obtain a respective embedding of the parent variable;

inputting the input value of the parent variable into the inference network to obtain a latent value modelling a respective confounder;

inputting the latent value into the second encoder to obtain a respective embedding of the respective confounder;

combining the embedding of the parent variable and the embedding of the respective confounder to obtain a combined embedding;

inputting the combined embedding into the decoder to obtain a reconstructed value of the selected variable; and updating a parameter of the inference network, the first and second encoders, or the first and second graph distributions based on an evaluated measure of difference between the reconstructed value and an observed value of the selected variable.

* * * * *